US012567197B2

(12) United States Patent
Nagano et al.

(10) Patent No.: US 12,567,197 B2
(45) Date of Patent: Mar. 3, 2026

(54) IMAGE SYNTHESIS USING DIFFUSION MODELS CREATED FROM SINGLE OR MULTIPLE VIEW IMAGES

(71) Applicant: NVIDIA Corporation, Santa Clara, CA (US)

(72) Inventors: Koki Nagano, Playa Vista, CA (US); Eric Ryan Wong Chan, Alameda, CA (US); Tero Tapani Karras, Helsinki (FI); Shalini De Mello, San Francisco, CA (US); Miika Samuli Aittala, Helsinki (FI); Matthew Aaron Wong Chan, Los Altos, CA (US)

(73) Assignee: NVIDIA Corporation, Santa Clara, CA (US)

( * ) Notice: Subject to any disclaimer, the term of this patent is extended or adjusted under 35 U.S.C. 154(b) by 223 days.

(21) Appl. No.: 18/485,225

(22) Filed: Oct. 11, 2023

(65) Prior Publication Data

US 2024/0135630 A1    Apr. 25, 2024

Related U.S. Application Data

(60) Provisional application No. 63/415,055, filed on Oct. 11, 2022.

(51) Int. Cl.
*G06T 15/06*        (2011.01)
*G06T 5/00*         (2024.01)
(Continued)

(52) U.S. Cl.
CPC ................ *G06T 15/06* (2013.01); *G06T 5/50* (2013.01); *G06T 5/70* (2024.01); *G06V 10/44* (2022.01);
(Continued)

(58) Field of Classification Search
CPC ......... G06T 15/06; G06T 15/04; G06T 15/08; G06T 15/80; G06T 15/205; G06T 17/00;
(Continued)

(56) References Cited

U.S. PATENT DOCUMENTS 11,176,642 B2 *  11/2021  Ramani ..................... G06T 5/60
11,475,542 B2 *  10/2022  Munkberg ................ G06T 5/70
(Continued)

*Primary Examiner* — Vijay Shankar

(74) *Attorney, Agent, or Firm* — Leydig, Voit & Mayer, Ltd.

(57) ABSTRACT

A method and system for performing novel image synthesis using generative networks are provided. The encoder-based model is trained to infer a 3D representation of an input image. A feature image is then generated using volume rendering techniques in accordance with the 3D representation. The feature image is then concatenated with a noisy image and processed by a denoiser network to predict an output image from a novel viewpoint that is consistent with the input image. The denoiser network can be a modified Noise Conditional Score Network (NCSN). In some embodiments, multiple input images or keyframes can be provided as input, and a different 3D representation is generated for each input image. The feature image is then generated, during volume rendering, by sampling each of the 3D representations and applying a mean-pooling operation to generate an aggregate feature image.

20 Claims, 9 Drawing Sheets

(51) Int. Cl.

| | |
|---|---|
| *G06T 5/50* | (2006.01) |
| *G06T 5/70* | (2024.01) |
| *G06V 10/44* | (2022.01) |
| *G06V 10/771* | (2022.01) |

(52) U.S. Cl.
CPC .. G06V 10/771 (2022.01); *G06T 2207/20084* (2013.01); *G06T 2207/20221* (2013.01)

(58) Field of Classification Search
CPC .......... G06T 17/005; G06T 5/50; G06T 5/70; G06T 2207/20084; G06T 2207/20221; G06T 2207/20081; G06T 5/60; G06V 10/44; G06V 10/771
See application file for complete search history.

(56) References Cited

U.S. PATENT DOCUMENTS

| | | | | |
|---|---|---|---|---|
| 11,508,037 | B2 * | 11/2022 | Yang | G06T 5/60 |
| 11,557,022 | B2 * | 1/2023 | Munkberg | G06N 3/04 |
| 2019/0304069 | A1 * | 10/2019 | Vogels | G06T 15/06 |
| 2020/0126192 | A1 * | 4/2020 | Munkberg | G06T 5/70 |
| 2023/0252607 | A1 * | 8/2023 | Schnellbaecher | G06T 5/20 |
| | | | | 382/157 |

* cited by examiner

605

IMAGE SYNTHESIS USING DIFFUSION MODELS CREATED FROM SINGLE OR MULTIPLE VIEW IMAGES

CROSS-REFERENCE TO RELATED APPLICATIONS

This application claims priority to U.S. Provisional Patent Application No. 63/415,055, filed on Oct. 11, 2022, which is hereby incorporated by reference in its entirety.

STATEMENT REGARDING FEDERALLY SPONSORED RESEARCH AND DEVELOPMENT

This invention was made with government support under Agreement No. HR00112030005, awarded by the Defense Advanced Research Projects Agency (DARPA). The government has certain rights in this invention.

BACKGROUND

Synthesizing computer images from additional viewpoints, using machine learning techniques, based on one or more input images representing a limited number of available viewpoints is a task that has been extensively studied. This task may be referred to as few-shot novel view synthesis. Previous approaches to solve this problem typically train models by direct regression of novel views using mean squared error (MSE) or L1 loss. Consequently, although few-shot novel view synthesis is inherently ill-defined and ambiguous, such regression-based algorithms are limited to predicting the mean of the distribution of possible novel views. As a result, these techniques result in trained models that produce blurry renderings and cannot sample from a range of discrete outputs.

One such approach addresses the task of novel view synthesis using a diffusion model conditioned on camera poses. While the method demonstrates multi-view, consistent novel view synthesis, the method is limited to using a single input image. Specifically, when the method autoregressively generates a next frame conditioned by previously generated frames, the method picks one of the views as the conditioning view and performs 256 diffusion steps to generate the novel view. While the method has been demonstrated using a single view, it is not clear whether the method would perform well when adapted to use multiple views as input. In addition, the demonstration of this technique is only demonstrated using relatively large models (e.g., 471M to 1.3B parameters) compared to other models producing images in a similar resolution.

The techniques discussed above have not been scaled from one to multiple input views, and have not shown to provide a correct choice of intermediate 3D representations that do not require an over parameterized model. Thus, there is a need for addressing these issues and/or other issues associated with the prior art.

SUMMARY

Embodiments of the present disclosure relate to methods and systems that synthesize images of objects from a limited set of viewpoints of the object. The systems and methods employ machine learning techniques to train a generative model to optimize a denoising objective of the resulting synthesized images.

In accordance with a first aspect of the present disclosure, a method is provided for performing novel image synthesis using generative networks. The method includes: receiving one or more input images; generating, using an encoder-based model, one or more three-dimensional (3D) representations of the one or more input images; generating a feature image, using a renderer, based on the one or more 3D representations; and generating an output image, using a denoiser, based at least on the feature image and a noisy image. Each 3D representation in the one or more representations corresponding to a particular input image of the one or more input images.

In accordance with at least one embodiment of the first aspect, the feature image comprises a plane-sweep volume (PSV) representation.

In accordance with at least one embodiment of the first aspect, generating the output image comprises generating the output image based on the feature image, the noisy image, and a relative pose vector.

In accordance with at least one embodiment of the first aspect, the encoder-based model comprises a deep convolution neural network (DCNN) configured to generate a set of low-resolution feature maps and a set of high-resolution feature maps using at least one atrous convolution layer.

In accordance with at least one embodiment of the first aspect, each of the one or more 3D representations comprises a five-dimensional (5D) frustum of shape features.

In accordance with at least one embodiment of the first aspect, the renderer is a volume renderer configured to trace rays through the one or more 3D representations to generate the feature image.

In accordance with at least one embodiment of the first aspect, the one or more input images comprises a plurality of input images. Generating the feature image comprises sampling, by the renderer, a sample from each of the one or more 3D representations and applying a mean-pooling operator to the plurality of samples.

In accordance with at least one embodiment of the first aspect, the denoiser comprises a Noise Conditional Score Network (NCSN).

In accordance with at least one embodiment of the first aspect, each 3D representation comprises a Neural Radiance Field (NeRF).

In accordance with at least one embodiment of the first aspect, the noisy image is generated by combining a plurality of noisy images corresponding to a plurality of frames of the video sequence.

In accordance with a second aspect of the present disclosure, a system is provided for performing novel image synthesis using generative networks. The system includes: a memory storing data for an encoder-based model, a renderer, and a denoiser; and one or more processors in communication with the memory. The one or more processors execute instructions to: receive one or more input images; generate, using the encoder-based model, one or more three-dimensional (3D) representations of the one or more input images; generate a feature image, using the renderer, based on the one or more 3D representations; and generate an output image, using the denoiser, based at least on the feature image and a noisy image. Each 3D representation in the one or more representations corresponding to a particular input image of the one or more input images.

In accordance with at least one embodiment of the second aspect, the feature image comprises a plane-sweep volume (PSV) representation.

In accordance with at least one embodiment of the second aspect, generating the output image comprises generating the output image based on the feature image, the noisy image, and a relative pose vector.

In accordance with at least one embodiment of the second aspect, the encoder-based model comprises a deep convolution neural network (DCNN) configured to generate a set of low-resolution feature maps and a set of high-resolution feature maps using at least one atrous convolution layer.

In accordance with at least one embodiment of the second aspect, each of the one or more 3D representations comprises a five-dimensional (5D) frustum of shape features.

In accordance with at least one embodiment of the second aspect, the renderer is a volume renderer configured to trace rays through the 3D representations to generate the feature image.

In accordance with at least one embodiment of the second aspect, the one or more input images comprises a plurality of input images. Generating the feature image comprises sampling, by the renderer, a sample from each of the 3D representations and applying a mean-pooling operator to the plurality of samples.

In accordance with at least one embodiment of the second aspect, the denoiser comprises a Noise Conditional Score Network (NCSN).

In accordance with at least one embodiment of the second aspect, the noisy image is generated by combining a plurality of noisy images corresponding to a plurality of frames of the video sequence.

In accordance with a third aspect of the present disclosure, a non-transitory computer-readable medium is provided, the computer-readable medium storing instructions that, upon execution by one or more processors, cause a computing device to perform the method of the first aspect.

BRIEF DESCRIPTION OF THE DRAWINGS

The present systems and methods that utilize machine learning techniques to synthesis computer generated images using diffusion models created from single or multiple view images are described in detail below with reference to the attached drawing figures, wherein.

DETAILED DESCRIPTION

Systems and methods are disclosed related to using a diffusion model to synthesize computer generated images. The diffusion model is trained using a generative model to optimize a denoising objective, which allows sampling of a distribution of plausible renderings of an object conditioned on an input. However, because every frame in a video sequence is generated independently, frames sampled from a wide distribution tend to be inconsistent with each other. In other words, in a video sequence of frames generated over a wide distribution of possible frames in the sequence, there tends to be lots of artifacts including, but not limited to, jitter, motion, or flicker between frames. To attempt to correct for these artifacts, the model can be conditioned on multiple past frames. Incorporating nearby information narrows the distribution of rendered images, enabling view-consistent video generation.

Aspects of the embodiments of the present disclosure uses a generative objective in the diffusion model that allows the system to generate realistic novel view images from one or multiple input images. This technique is not limited to one or even a small number of input views.

Given an input image or images, the system auto-regressively generates next frames in a video sequence that are consistent with each other. When only a single input image is provided, the algorithm can predict a novel view within proximity to the input image as a keyframe, and yet another view can be predicted from the previous keyframes such that the following generated view is consistent with existing keyframes. The algorithm is not limited to using a single input view to condition the next frame, but can instead condition the next frame on multiple, previous keyframes.

When multiple input images are provided, the algorithm can aggregate predictions from all views to predict a new view. In an embodiment, the aggregation step can be implemented via a mean operator or transformer. The algorithm may combine a classifier-free guidance method such that a single model can operate as both an unconditioned generator and conditional generator that can take an arbitrary number of images as input.

In some embodiments, the model may utilize an intermediate 3D representation of an object comprising a voxel feature representation. Specifically, when training the view synthesis diffusion model, the algorithm can create a 3D feature volume from an image encoder to use as the intermediate 3D representation of the object.

In some embodiments, the model may utilize an intermediate 3D representation of an object comprising a plane-sweep volume representation, which encourages view-to-view consistent image generation. This information can be combined with camera pose information as a conditioning input on the diffusion model.

Figure 1A:
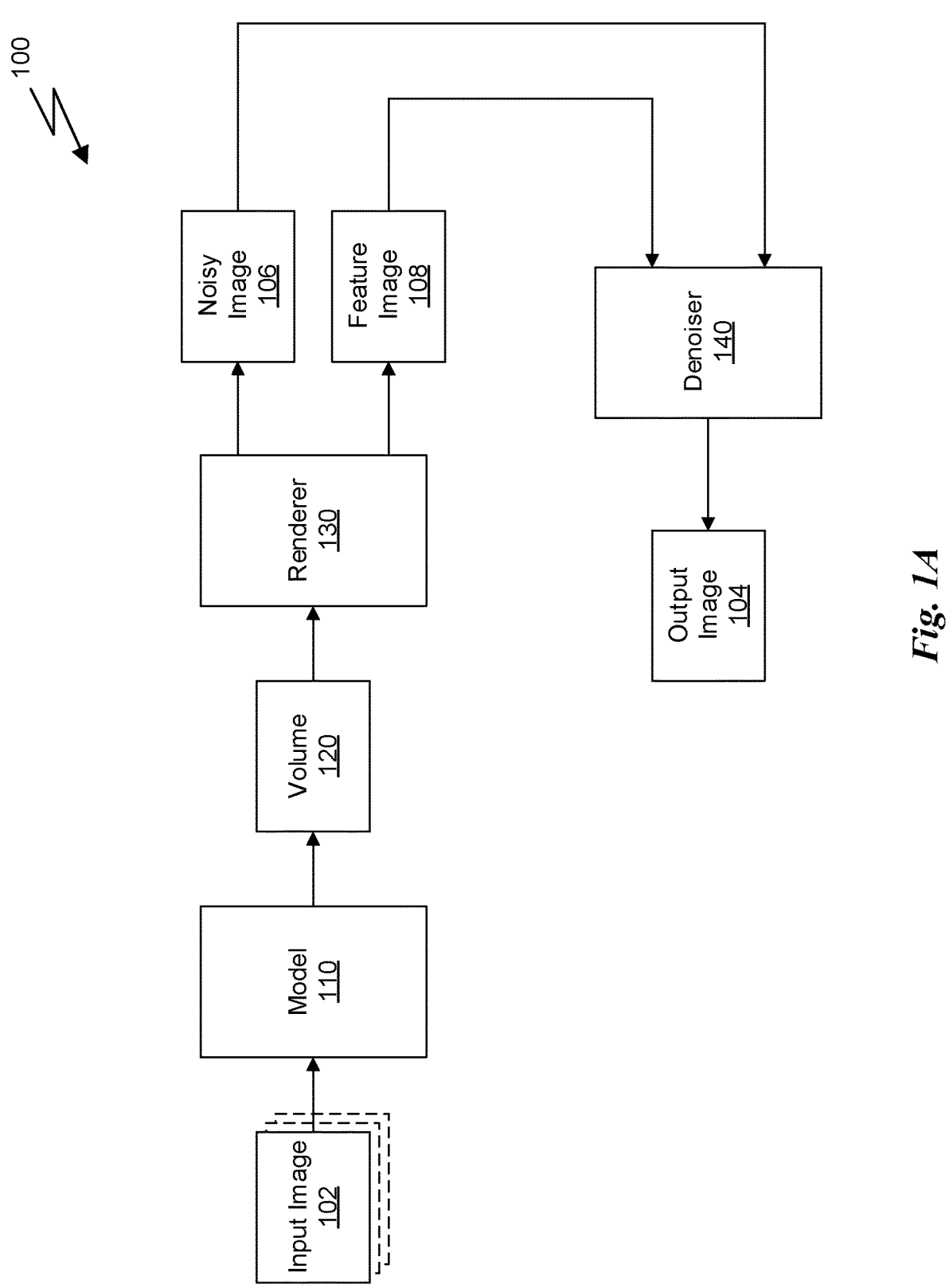
FIG. 1A illustrates a system architecture for performing novel view synthesis using a generative model, in accordance with some embodiments of the present disclosure.

FIG. 1A illustrates a system 100 architecture for performing novel view synthesis using a generative model, in accordance with some embodiments of the present disclosure. The system 100 includes at least an encoder-based model 110, a renderer 130, and a denoiser 140. In an embodiment, the encoder-based model 110 is an encoder-based model that is configured to process an input image 102 and generate a three-dimensional (3D) representation 120 of shape features, such as a voxel field or other volume representation of the scene in the input image 102. The renderer 130 may be a volume renderer configured to trace rays through the frustum of the 3D representation 120 to generate a feature image 108 using volumetric rendering techniques. The denoiser 140 processes a noisy image 106 and the 3D prior information from the rendered feature image 108 to generate an output image 104. The noisy image 106 is just an image of randomly sampled, pure Gaussian noise given by $x \sim N(0, \sigma^2 I)$. The output image 104 represents a novel view of the scene in the input image 102 with reduced temporal artifacts compared to other prior art techniques used for novel view synthesis from a single input image.

In an embodiment, the encoder-based model 110 is configured to receive an input image 102 and process the input image 102 with a DCNN (Deep Convolution Neural Network) that may be referred to herein as an atrous convolution network. The atrous convolution network processes, through a number of convolution layers, the image to generate a set of low-resolution feature maps. In some embodiments, a 256×256 pixel input image 102 is processed by the atrous convolution network to generate a set of feature maps having dimensions of 8×8 pixels, with each feature map of the set of feature maps corresponding to a different channel (e.g., feature). In other words, the feature maps have a smaller resolution compared to the input image 102 by a factor of 32. In some cases, there can be up to 1024 channels in the set of low-resolution feature maps.

In addition to generating the low-resolution feature maps, the atrous convolution network is also configured to perform spatial pyramid pooling (SPP) using atrous convolution. More specifically, the atrous convolution network is configured to generate a number of high-resolution feature maps at an intermediate layer of the DCNN, which are then processed in parallel by a number of different atrous convolution modules. In some embodiments, the intermediate layer can generate feature maps at 2, 4, 8, 16, or 32 times the resolution of the low-resolution feature maps. This can be accomplished by processing the output of an intermediate block of the DCNN by each of the atrous convolution modules. In some cases, the atrous convolution modules may be configured to process the input image 102 directly such that the high-resolution feature maps match the resolution of the input image 102. In other embodiments, the spatial resolution of the high-resolution feature maps is less than the spatial resolution of the input image 102 but greater than the resolution of the low-resolution feature maps generated by the full DCNN. In an embodiment, the DCNN may be implemented as a DeepLabv3 model, as described in more detail in Chen et al., "Rethinking Atrous Convolution for Semantic Image Segmentation," arXiv: 1706.05587v3 (Dec. 5, 2017), which is herein incorporated by reference in its entirety.

In an embodiment, the DeepLabv3 model architecture described in Chen et al. is modified to produce a four-dimensional (4D) feature image of shape features (batch, feature channels x frustum depth, frustum height, frustum width), which is then re-shaped into a five dimensional (5D) feature frustum. The 5D feature frustum output by the encoder-based model 110 may be used as the 3D representation 120. In other embodiments, the encoder-based model 110 can be configured to predict/generate other types of 3D representations of the input image, including but not limited to a Neural Radiance Field (NeRF) or a triplane representation.

When rendering an image based on a single input image 102, the renderer 130 is configured, via volume rendering techniques, to render a single feature image 108 by tracing rays through the 3D representation 120 using volumetric rendering techniques, as described in Mildenhall et al., "NeRF: Representing Scenes as Neural Radiance Fields for View Synthesis," Computer Vision and Pattern Recognition, arXiv: 2003.08934 (August 2020), which is herein incorporated by reference in its entirety.

In an embodiment, the 3D representation 120 can be converted to a 2D image using a neural renderer 130, which may alternately be referred to as a volume renderer, which may include a decoder (e.g., MLP network) with one or more fully connected layers trained to convert the 3D representation 120 to color and/or density information. In some embodiments, the neural renderer 130 may be configured to render the 2D image at full resolution. In other embodiments, the neural renderer 130 may be configured to render a low-resolution feature image (e.g., with 32 channels) using a volume rendering technique, which can then be upsampled into a high-resolution image (e.g., RGB) using image-space convolutions provided by the super resolution module of the neural renderer 130. Such neural renderers 130 for converting 3D representations to 2D images are known in the art and may be described, for example, in Chan et al., "Efficient Geometry-aware 3D Generative Adversarial Networks," Computer Vision and Pattern Recognition, arXiv: 2112.07945 (April 2022), which is herein incorporated by reference in its entirety. In an embodiment, a 2D image can be rendered from an arbitrary viewpoint by concatenating pose information with the 3D representation 120, and then processing the concatenated information by the neural renderer 130

In some embodiments, the system 100 can be configured to render an image based on multiple input images 102 (e.g., multiple prior keyframes). In such embodiments, a separate 3D representation 120 is generated for each input image 102 and then the renderer 130 is configured to, for any coordinate in 3D space, sample an aggregate vector by using mean-pooling across input frustums from the multiple independent 3D representations 120. In other words, generating the feature image 108 comprises sampling, by the renderer 130, a sample from each of the plurality of 3D representations 120, and applying a mean-pooling operator to the plurality of samples to generate a corresponding value for the coordinate for the feature image 108. Thus, even when providing multiple input images 102 as priors, a single feature image 108 will be generated from the multiple 3D representations 120 corresponding to the multiple input images 102. The denoiser 140 then processes the aggregate feature image 108 and the noisy image 106 in the same manner regardless of whether one or multiple input images are provided as input.

In an embodiment, the denoiser 140 is based on a score-modeling neural network. In an embodiment, the denoiser 140 is based on a modified implementation of a Noise Conditional Score Network (NCSN) as described in more detail in Karras et al., "Elucidating the Design Space of Diffusion-based Generative Models," Computer Vision and Pattern Recognition, arXiv: 2206.00364 (October 2022), which is herein incorporated by reference in its entirety. More specifically, the architecture described in Karras et al. is adapted by modifying the input channel dimension to accept the noisy image 106 concatenated, channel-wise, with the feature image 108 that provides the prior conditioning information. The pre-conditioning strategy proposed in Karras et al. can also be utilized.

The denoiser 140 is trained end-to-end, to optimize a denoising objective (i.e., given a noisy input image and conditional context information, the model is optimized to produce a denoised version of the input image from the distribution of input images in the input image space). In an embodiment, during training of the denoiser 140, the conditioning information (i.e., the feature image 108) is replaced in the input with Gaussian white noise, at a set probability (e.g., 10%). The denoiser 140 is therefore trained to learn a distribution of plausible renderings, based on the conditional context provided by the feature image 108, which can then be sampled based on the noisy image 106. During inference, the denoiser 140 can utilize classifier-free guidance to improve sample fidelity.

In an embodiment, the denoiser 140 accepts as input an 18-channel tensor. The spatial resolution of the noisy image 106 and the feature image 108 may be, e.g., 128×128 pixels. The output image 104 may be a three-channel, RGB image having spatial dimensions of 128×128 pixels. The noisy image 106 may comprise three channels corresponding to noise related to the three color channels of the outpu image 104. The feature image 108 may comprise fifteen channels of shape features. However, in other embodiments, the spatial resolution of the noisy image 106 and the feature image 108 may be increased or reduced to match the size of the network implemented by the denoiser 140, and the number of channels of the feature image 108 may be increased to represent additional shape features.

Figure 1B:
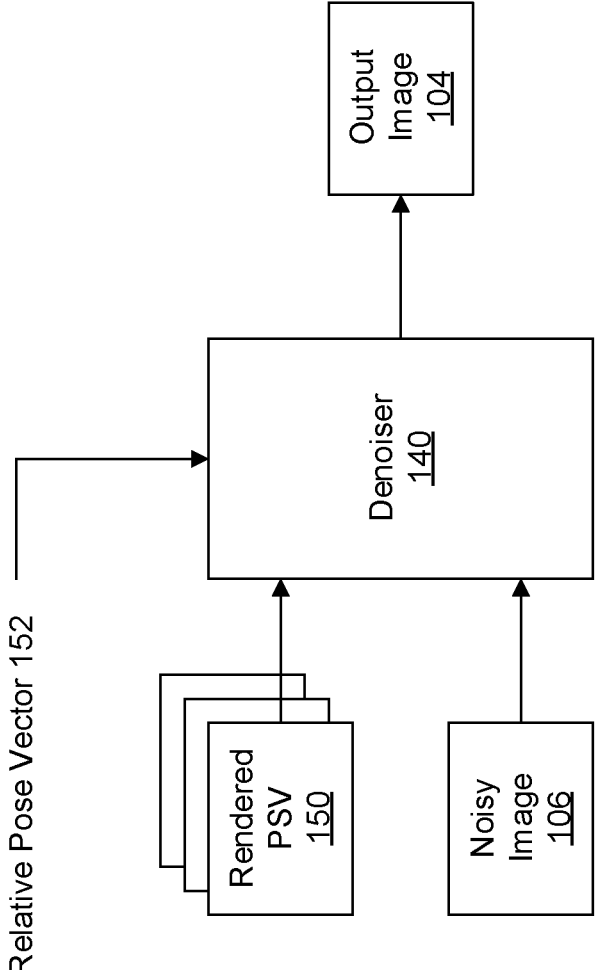
FIG. 1B illustrates a modified version of the system architecture configured to utilize a plane-sweep volume (PSV) representation of the feature image, in accordance with an embodiment of the present disclosure.

In another embodiment, the renderer 130 is configured to generate a rendered plane-sweep volume (PSV) representation of the input image 102. FIG. 1B illustrates a modified version of the system architecture 100 configured to utilize a plane-sweep volume (PSV) representation of the feature image 108, in accordance with an embodiment of the present disclosure. A PSV representation 150 refers to a set of 2D images of the same scene from different camera positions relative to a reference position corresponding to a camera associated with the input image 102. Each 2D image of the PSV representation 150 can be generated by tracing rays from different virtual camera locations and/or orientations into the 3D representation 120.

The input to the denoiser 140 may be modified to include the noisy image 106 concatenated with the rendered PSV representation 150. In addition, the denoiser 140 may be provided with a relative pose vector 152, which is used to specify a camera location and/or orientation associated with the desired output image 104.

Because each frame in a video sequence is sampled independently over time, frames sampled from a wide distribution tend to be inconsistent with each other. This can result in lots of jitter/motion/flicker type artifacts between frames. In order to reduce these artifacts, the system architecture 100 is configured to autoregressively generate image frames by conditioning the output image on a nearby view (e.g., by specifying the relative pose vector), which narrows the range of possibilities and ensures frame-to-frame consistency.

Figures 2A, 2B:
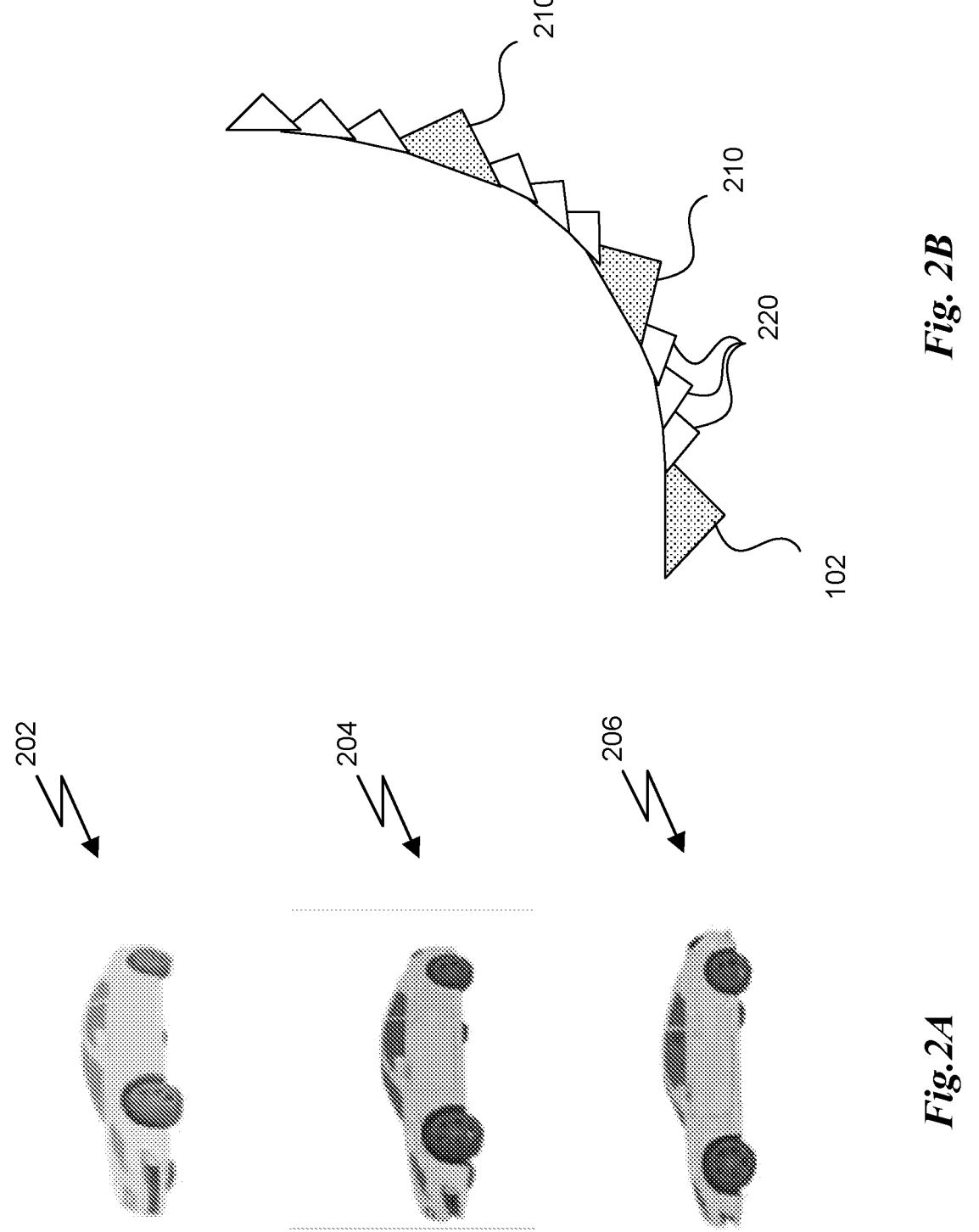
FIGS. 2A & 2B illustrate autoregressive generation of a video sequence using keyframes, in accordance with an embodiment of the present disclosure.

FIGS. 2A & 2B illustrate autoregressive generation of a video sequence using keyframes, in accordance with an embodiment of the present disclosure. An input image 102 corresponds to a first keyframe of the video sequence. The first keyframe may be associated with a time t=0 and an orientation of 0 degrees. For each subsequent frame in the video sequence, the relative pose vector can be swept along a path, such as by the path illustrated in FIG. 2B. For example, the camera can be swept along a path that changes orientation by 90 degrees from 0 degrees to 90 degrees in, e.g., 7.5 degree increments. As shown, the keyframes 210 represent 0, 30, and 60 degree orientations. As each frame is generated (at time t=1, 2, . . . , n), the next frame can rely on the prior condition of the input image 102, converted into the PSV representation 150 by the encoder-based model 110 and renderer 130, and a new relative pose vector 152 to generate a new output image 104.

The large, shaded triangles in FIG. 2B represent keyframes 210 in the video sequence. The small, unshaded triangles in FIG. 2B represent frames 220 in the video sequence. In an embodiment, as new keyframes 210 are generated, the new keyframes 210 can be added to the original input image 102 to provide multiple input images 102 in order to generate an aggregate 3D representation, as described above. Thus, as the sequence of video frames is generated, new keyframes 210 will also be generated every, e.g., m frames, which can be used to further inform the information fed into the encoder-based model 110 to generate a more consistent 3D representation 120 of the scene.

In another embodiments, the keyframes 210 can be provided in addition to the input image 102, and used as a plurality of input images 102. The frames 220 between keyframes 210 can then be generated using the techniques described above. In an embodiment, only the two nearest keyframes proximate a particular frame (e.g., the keyframe immediately preceding and the keyframe immediately following the particular frame), in the video sequence, will be used as input images 102 to generate a particular 3D representation of the scene for generating the output image 104 of the particular frame. In other embodiments, two or more keyframes preceding and/or two or more keyframes following the particular frame can be used as the input images 102 provided as the conditional information to the encoder-based model 110.

As shown in FIG. 2A, the output image 202 corresponds to the first frame of the video sequence, and can be the same as the input image 102. The output images 204 and 206 correspond to the two subsequent keyframes 210 in the video sequence. As can be observed, a car in the output images 202, 204, 206 appears to rotate relative to the camera, as corresponds with a change in the relative pose vector as each subsequent frame of the video sequence is rendered.

It will be appreciated that each frame in the video sequence is generated independently based on separate and independent noisy images 106 sampled for each frame. In an embodiment, in order to better improve temporal consistency between frames without sacrificing long-range consistency by reducing the distribution of the noise, a mean operator can be used to aggregate multi-view information.

In an embodiment, the noise predictions for several frames can be combined using a simple arithmetic mean operation to generate an aggregate noisy image for a frame based on the noisy images predicted for the current frame and the previous n-1 frames. A buffer can be used to store n noisy images 106 generated for the last n frames of a video sequence. An aggregate noisy image is then generated by computing a mean of each pixel in the n noisy images 106, and the aggregate noisy image is then concatenated with the feature image 108 to generate the output image 104 for the frame.

Figure 3:
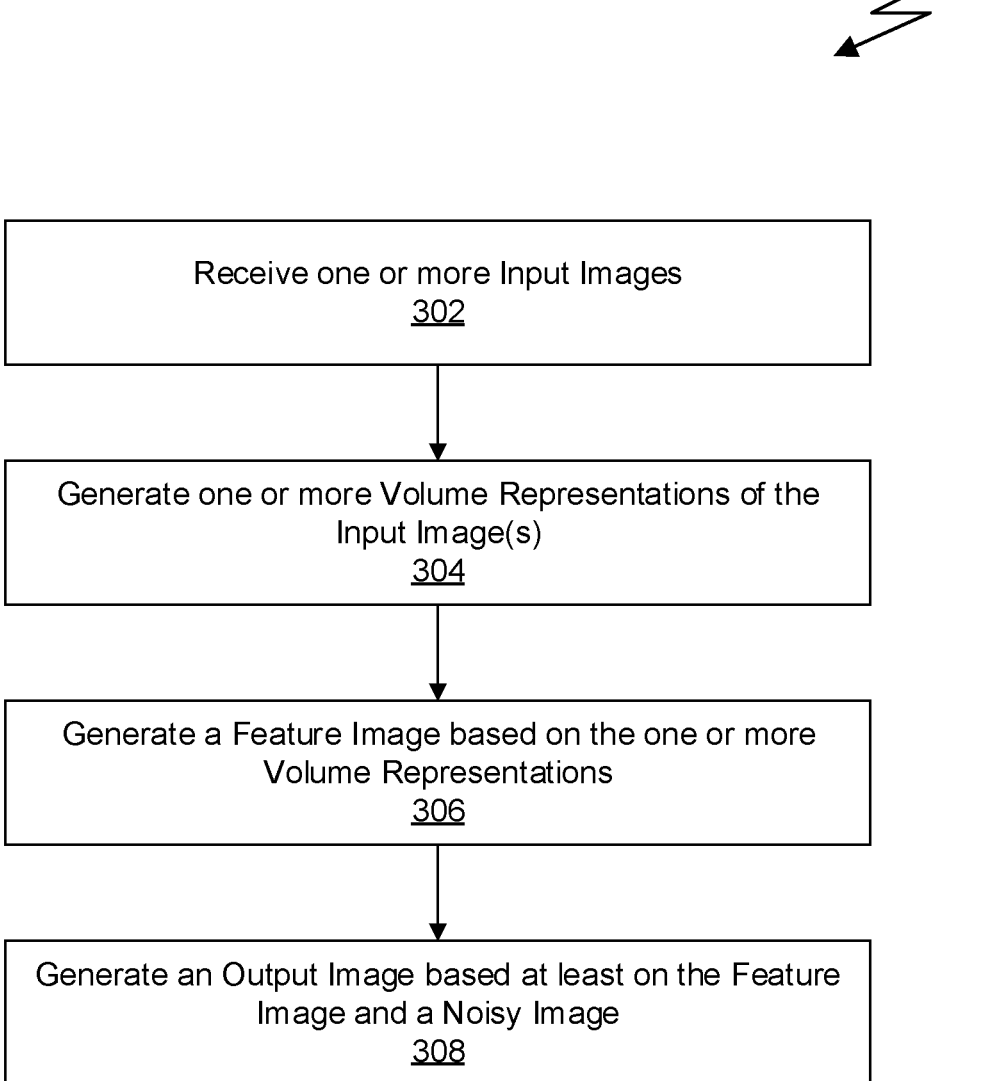
FIG. 3 is a flowchart of a method for performing novel view synthesis using a generative model, in accordance with at least one embodiment of the present disclosure.

FIG. 3 is a flowchart of a method 300 for performing novel view synthesis using a generative model, in accordance with at least one embodiment of the present disclosure. The method 300 may be implemented on any combination of hardware, firmware, or software. In an embodiment, the method 300 is implemented, at least in part, on one or more processors of a computing device. In some embodiments, the one or more processors may include a parallel processing unit that executes instructions to implement the functionality of the architecture, or components of the architecture, described above.

At 302, one or more input images 102 are received. Each input image 102 can represent a keyframe of a video sequence. In an embodiment, a single input image 102 is received, from which one or more output images 104 may be generated. In another embodiment, a plurality of input images 102 are received, from which one or more output images 104 may be generated. Each input image may be a data structure, stored in a memory, which encodes color information for one or more channels. For example, each input image may be a RGB image having three color channels, at an arbitrary resolution. In some embodiments, the input images 102 may be scaled (e.g., upsampled, downsampled, etc.) and/or cropped to match a desired spatial resolution of the encoder-based model 110.

At 304, one or more 3D representations 120 of the input image(s) 102 is/are generated using an encoder-based model. The encoder-based model may utilize at least one atrous convolution layer and may be, e.g., a modified implementation of a DeepLabv3 model. In an embodiment, the 3D representation 120 is a 5D frustum that encodes a voxel field.

At 306, a feature image 108 is generated based on the one or more 3D representations 120. Volume rendering techniques can be used to trace a plurality of rays through the 3D representation(s) 120 to generate the feature image 108.

At 308, an output image is generated using a denoiser based on the feature image 108 and a noisy image 106. The denoiser may be an implementation of a noise conditional score network (NCSN).

The method 300 can be repeated for a number of frames in a video sequence, with each frame being generated independently based on a different noisy image 106. Consistency across the video sequence can be improved by specifying multiple keyframes in the image sequence (e.g., providing multiple input images 102 corresponding to different frames of the video sequence) and/or aggregating noise information predicted for multiple frames.

The techniques disclosed herein can be implemented via any combination of hardware and software. In some embodiments, the diffusion model is implemented as a number of instructions, executable by one or more processors. In some embodiments, at least a portion of the models may be implemented on a parallel processing unit, such as PPU 400 described in more detail below.

Parallel Processing Architecture

Figure 4:
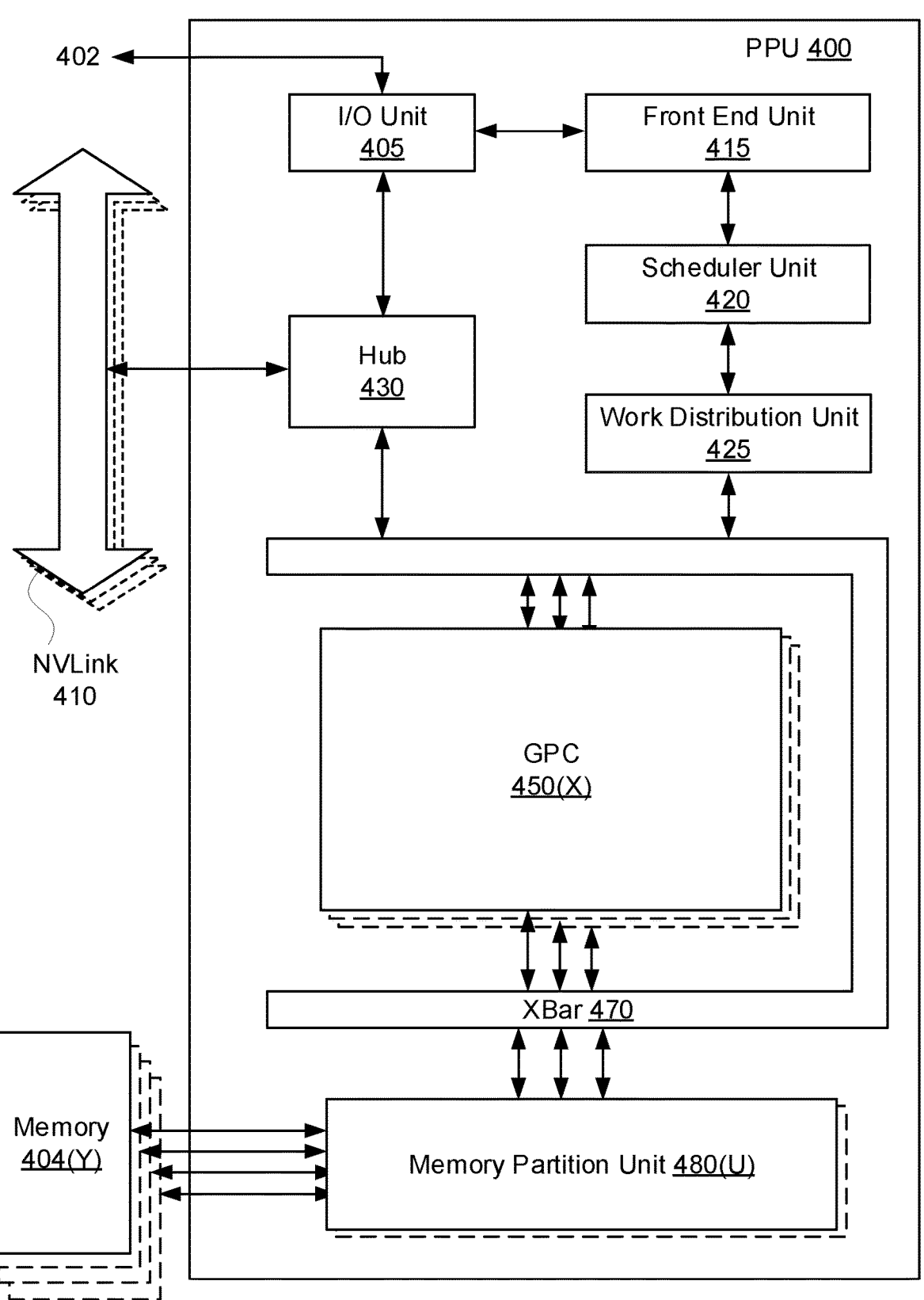
FIG. 4 illustrates an example parallel processing unit suitable for use in implementing some embodiments of the present disclosure.

FIG. 4 illustrates a parallel processing unit (PPU) 400, in accordance with an embodiment. The PPU 400 may be used to implement various aspects of the present disclosure, including, e.g., executing instructions to implement at least part of a machine learning or artificial intelligence algorithm, such as a neural network, ensemble classifier, or other types of AI algorithms. The PPU 400 may be used to implement the convolutional structured state space model, described above.

In an embodiment, the PPU 400 is a multi-threaded processor that is implemented on one or more integrated circuit devices. The PPU 400 is a latency hiding architecture designed to process many threads in parallel. A thread (e.g., a thread of execution) is an instantiation of a set of instructions configured to be executed by the PPU 400. In an embodiment, the PPU 400 is a graphics processing unit (GPU) configured to implement a graphics rendering pipeline for processing three-dimensional (3D) graphics data in order to generate two-dimensional (2D) image data for display on a display device. In other embodiments, the PPU

400 may be utilized for performing general-purpose computations. While one exemplary parallel processor is provided herein for illustrative purposes, it should be strongly noted that such processor is set forth for illustrative purposes only, and that any processor may be employed to supplement and/or substitute for the same.

One or more PPUs 400 may be configured to accelerate thousands of High Performance Computing (HPC), data center, cloud computing, and machine learning applications. The PPU 400 may be configured to accelerate numerous deep learning systems and applications for autonomous vehicles, simulation, computational graphics such as ray or path tracing, deep learning, high-accuracy speech, image, and text recognition systems, intelligent video analytics, molecular simulations, drug discovery, disease diagnosis, weather forecasting, big data analytics, astronomy, molecular dynamics simulation, financial modeling, robotics, factory automation, real-time language translation, online search optimizations, and personalized user recommendations, and the like.

As shown in FIG. 4, the PPU 400 includes an Input/Output (I/O) unit 405, a front end unit 415, a scheduler unit 420, a work distribution unit 425, a hub 430, a crossbar (Xbar) 470, one or more general processing clusters (GPCs) 450, and one or more memory partition units 480. The PPU 400 may be connected to a host processor or other PPUs 400 via one or more high-speed NVLink 410 interconnect. The PPU 400 may be connected to a host processor or other peripheral devices via an interconnect 402. The PPU 400 may also be connected to a local memory 404 comprising a number of memory devices. In an embodiment, the local memory may comprise a number of dynamic random access memory (DRAM) devices. The DRAM devices may be configured as a high-bandwidth memory (HBM) subsystem, with multiple DRAM dies stacked within each device.

The NVLink 410 interconnect enables systems to scale and include one or more PPUs 400 combined with one or more CPUs, supports cache coherence between the PPUs 400 and CPUs, and CPU mastering. Data and/or commands may be transmitted by the NVLink 410 through the hub 430 to/from other units of the PPU 400 such as one or more copy engines, a video encoder, a video decoder, a power management unit, etc. (not explicitly shown). The NVLink 410 is described in more detail in conjunction with FIG. 5B.

The I/O unit 405 is configured to transmit and receive communications (e.g., commands, data, etc.) from a host processor (not shown) over the interconnect 402. The I/O unit 405 may communicate with the host processor directly via the interconnect 402 or through one or more intermediate devices such as a memory bridge. In an embodiment, the I/O unit 405 may communicate with one or more other processors, such as one or more the PPUs 400 via the interconnect 402. In an embodiment, the I/O unit 405 implements a Peripheral Component Interconnect Express (PCIe) interface for communications over a PCIe bus and the interconnect 402 is a PCIe bus. In alternative embodiments, the I/O unit 405 may implement other types of well-known interfaces for communicating with external devices.

The I/O unit 405 decodes packets received via the interconnect 402. In an embodiment, the packets represent commands configured to cause the PPU 400 to perform various operations. The I/O unit 405 transmits the decoded commands to various other units of the PPU 400 as the commands may specify. For example, some commands may be transmitted to the front end unit 415. Other commands may be transmitted to the hub 430 or other units of the PPU 400 such as one or more copy engines, a video encoder, a video decoder, a power management unit, etc. (not explicitly shown). In other words, the I/O unit 405 is configured to route communications between and among the various logical units of the PPU 400.

In an embodiment, a program executed by the host processor encodes a command stream in a buffer that provides workloads to the PPU 400 for processing. A workload may comprise several instructions and data to be processed by those instructions. The buffer is a region in a memory that is accessible (e.g., read/write) by both the host processor and the PPU 400. For example, the I/O unit 405 may be configured to access the buffer in a system memory connected to the interconnect 402 via memory requests transmitted over the interconnect 402. In an embodiment, the host processor writes the command stream to the buffer and then transmits a pointer to the start of the command stream to the PPU 400. The front end unit 415 receives pointers to one or more command streams. The front end unit 415 manages the one or more streams, reading commands from the streams and forwarding commands to the various units of the PPU 400.

The front end unit 415 is coupled to a scheduler unit 420 that configures the various GPCs 450 to process tasks defined by the one or more streams. The scheduler unit 420 is configured to track state information related to the various tasks managed by the scheduler unit 420. The state may indicate which GPC 450 a task is assigned to, whether the task is active or inactive, a priority level associated with the task, and so forth. The scheduler unit 420 manages the execution of a plurality of tasks on the one or more GPCs 450.

The scheduler unit 420 is coupled to a work distribution unit 425 that is configured to dispatch tasks for execution on the GPCs 450. The work distribution unit 425 may track a number of scheduled tasks received from the scheduler unit 420. In an embodiment, the work distribution unit 425 manages a pending task pool and an active task pool for each of the GPCs 450. As a GPC 450 finishes the execution of a task, that task is evicted from the active task pool for the GPC 450 and one of the other tasks from the pending task pool is selected and scheduled for execution on the GPC 450. If an active task has been idle on the GPC 450, such as while waiting for a data dependency to be resolved, then the active task may be evicted from the GPC 450 and returned to the pending task pool while another task in the pending task pool is selected and scheduled for execution on the GPC 450.

In an embodiment, a host processor executes a driver kernel that implements an application programming interface (API) that enables one or more applications executing on the host processor to schedule operations for execution on the PPU 400. In an embodiment, multiple compute applications are simultaneously executed by the PPU 400 and the PPU 400 provides isolation, quality of service (QoS), and independent address spaces for the multiple compute applications. An application may generate instructions (e.g., API calls) that cause the driver kernel to generate one or more tasks for execution by the PPU 400. The driver kernel outputs tasks to one or more streams being processed by the PPU 400. Each task may comprise one or more groups of related threads, referred to herein as a warp. In an embodiment, a warp comprises 32 related threads that may be executed in parallel. Cooperating threads may refer to a plurality of threads including instructions to perform the task and that may exchange data through shared memory. The tasks may be allocated to one or more processing units within a GPC 450 and instructions are scheduled for execution by at least one warp.

The work distribution unit 425 communicates with the one or more GPCs 450 via XBar 470. The XBar 470 is an interconnect network that couples many of the units of the PPU 400 to other units of the PPU 400. For example, the XBar 470 may be configured to couple the work distribution unit 425 to a particular GPC 450. Although not shown explicitly, one or more other units of the PPU 400 may also be connected to the XBar 470 via the hub 430.

The tasks are managed by the scheduler unit 420 and dispatched to a GPC 450 by the work distribution unit 425. The GPC 450 is configured to process the task and generate results. The results may be consumed by other tasks within the GPC 450, routed to a different GPC 450 via the XBar 470, or stored in the memory 404. The results can be written to the memory 404 via the memory partition units 480, which implement a memory interface for reading and writing data to/from the memory 404. The results can be transmitted to another PPU 400 or CPU via the NVLink 410. In an embodiment, the PPU 400 includes a number U of memory partition units 480 that is equal to the number of separate and distinct memory devices of the memory 404 coupled to the PPU 400. Each GPC 450 may include a memory management unit to provide translation of virtual addresses into physical addresses, memory protection, and arbitration of memory requests. In an embodiment, the memory management unit provides one or more translation lookaside buffers (TLBs) for performing translation of virtual addresses into physical addresses in the memory 404.

In an embodiment, the memory partition unit 480 includes a Raster Operations (ROP) unit, a level two (L2) cache, and a memory interface that is coupled to the memory 404. The memory interface may implement 32, 64, 128, 1024-bit data buses, or the like, for high-speed data transfer. The PPU 400 may be connected to up to Y memory devices, such as high bandwidth memory stacks or graphics double-data-rate, version 5, synchronous dynamic random access memory, or other types of persistent storage. In an embodiment, the memory interface implements an HBM2 memory interface and Y equals half (J. In an embodiment, the HBM2 memory stacks are located on the same physical package as the PPU 400, providing substantial power and area savings compared with conventional GDDR5 SDRAM systems. In an embodiment, each HBM2 stack includes four memory dies and Y equals 4, with each HBM2 stack including two 128-bit channels per die for a total of 8 channels and a data bus width of 1024 bits.

In an embodiment, the memory 404 supports Single-Error Correcting Double-Error Detecting (SECDED) Error Correction Code (ECC) to protect data. ECC provides higher reliability for compute applications that are sensitive to data corruption. Reliability is especially important in large-scale cluster computing environments where PPUs 400 process very large datasets and/or run applications for extended periods.

In an embodiment, the PPU 400 implements a multi-level memory hierarchy. In an embodiment, the memory partition unit 480 supports a unified memory to provide a single unified virtual address space for CPU and PPU 400 memory, enabling data sharing between virtual memory systems. In an embodiment the frequency of accesses by a PPU 400 to memory located on other processors is traced to ensure that memory pages are moved to the physical memory of the PPU 400 that is accessing the pages more frequently. In an embodiment, the NVLink 410 supports address translation services allowing the PPU 400 to directly access a CPU's page tables and providing full access to CPU memory by the PPU 400.

In an embodiment, copy engines transfer data between multiple PPUs 400 or between PPUs 400 and CPUs. The copy engines can generate page faults for addresses that are not mapped into the page tables. The memory partition unit 480 can then service the page faults, mapping the addresses into the page table, after which the copy engine can perform the transfer. In a conventional system, memory is pinned (e.g., non-pageable) for multiple copy engine operations between multiple processors, substantially reducing the available memory. With hardware page faulting, addresses can be passed to the copy engines without worrying if the memory pages are resident, and the copy process is transparent.

Data from the memory 404 or other system memory may be fetched by the memory partition unit 480 and stored in the L2 cache 460, which is located on-chip and is shared between the various GPCs 450. As shown, each memory partition unit 480 includes a portion of the L2 cache associated with a corresponding memory 404. Lower level caches may then be implemented in various units within the GPCs 450. For example, each of the processing units within a GPC 450 may implement a level one (L1) cache. The L1 cache is private memory that is dedicated to a particular processing unit. The L2 cache 460 is coupled to the memory interface 470 and the XBar 470 and data from the L2 cache may be fetched and stored in each of the L1 caches for processing.

In an embodiment, the processing units within each GPC 450 implement a SIMD (Single-Instruction, Multiple-Data) architecture where each thread in a group of threads (e.g., a warp) is configured to process a different set of data based on the same set of instructions. All threads in the group of threads execute the same instructions. In another embodiment, the processing unit implements a SIMT (Single-Instruction, Multiple Thread) architecture where each thread in a group of threads is configured to process a different set of data based on the same set of instructions, but where individual threads in the group of threads are allowed to diverge during execution. In an embodiment, a program counter, call stack, and execution state is maintained for each warp, enabling concurrency between warps and serial execution within warps when threads within the warp diverge. In another embodiment, a program counter, call stack, and execution state is maintained for each individual thread, enabling equal concurrency between all threads, within and between warps. When execution state is maintained for each individual thread, threads executing the same instructions may be converged and executed in parallel for maximum efficiency.

Cooperative Groups is a programming model for organizing groups of communicating threads that allows developers to express the granularity at which threads are communicating, enabling the expression of richer, more efficient parallel decompositions. Cooperative launch APIs support synchronization amongst thread blocks for the execution of parallel algorithms. Conventional programming models provide a single, simple construct for synchronizing cooperating threads: a barrier across all threads of a thread block (e.g., the syncthreads ( ) function). However, programmers would often like to define groups of threads at smaller than thread block granularities and synchronize within the defined groups to enable greater performance, design flexibility, and software reuse in the form of collective group-wide function interfaces.

Cooperative Groups enables programmers to define groups of threads explicitly at sub-block (e.g., as small as a single thread) and multi-block granularities, and to perform collective operations such as synchronization on the threads in a cooperative group. The programming model supports clean composition across software boundaries, so that libraries and utility functions can synchronize safely within their local context without having to make assumptions about convergence. Cooperative Groups primitives enable new patterns of cooperative parallelism, including producer-consumer parallelism, opportunistic parallelism, and global synchronization across an entire grid of thread blocks.

Each processing unit includes a large number (e.g., 128, etc.) of distinct processing cores (e.g., functional units) that may be fully-pipelined, single-precision, double-precision, and/or mixed precision and include a floating point arithmetic logic unit and an integer arithmetic logic unit. In an embodiment, the floating point arithmetic logic units implement the IEEE 754-2008 standard for floating point arithmetic. In an embodiment, the cores include 64 single-precision (32-bit) floating point cores, 64 integer cores, 32 double-precision (64-bit) floating point cores, and 8 tensor cores.

Tensor cores configured to perform matrix operations. In particular, the tensor cores are configured to perform deep learning matrix arithmetic, such as GEMM (matrix-matrix multiplication) for convolution operations during neural network training and inferencing. In an embodiment, each tensor core operates on a 4×4 matrix and performs a matrix multiply and accumulate operation D=A×B+C, where A, B, C, and D are 4×4 matrices.

In an embodiment, the matrix multiply inputs A and B may be integer, fixed-point, or floating point matrices, while the accumulation matrices C and D may be integer, fixed-point, or floating point matrices of equal or higher bitwidths. In an embodiment, tensor cores operate on one, four, or eight bit integer input data with 32-bit integer accumulation. The 8-bit integer matrix multiply requires 1024 operations and results in a full precision product that is then accumulated using 32-bit integer addition with the other intermediate products for a 8×8×16 matrix multiply. In an embodiment, tensor Cores operate on 16-bit floating point input data with 32-bit floating point accumulation. The 16-bit floating point multiply requires 64 operations and results in a full precision product that is then accumulated using 32-bit floating point addition with the other intermediate products for a 4×4×4 matrix multiply. In practice, Tensor Cores are used to perform much larger two-dimensional or higher dimensional matrix operations, built up from these smaller elements. An API, such as CUDA 9 C++ API, exposes specialized matrix load, matrix multiply and accumulate, and matrix store operations to efficiently use Tensor Cores from a CUDA-C++ program. At the CUDA level, the warp-level interface assumes 16×16 size matrices spanning all 32 threads of the warp.

Each processing unit may also comprise M special function units (SFUs) that perform special functions (e.g., attribute evaluation, reciprocal square root, and the like). In an embodiment, the SFUs may include a tree traversal unit configured to traverse a hierarchical tree data structure. In an embodiment, the SFUs may include texture unit configured to perform texture map filtering operations. In an embodiment, the texture units are configured to load texture maps (e.g., a 2D array of texels) from the memory 404 and sample the texture maps to produce sampled texture values for use in shader programs executed by the processing unit. In an embodiment, the texture maps are stored in shared memory that may comprise or include an L1 cache. The texture units implement texture operations such as filtering operations using mip-maps (e.g., texture maps of varying levels of detail). In an embodiment, each processing unit includes two texture units.

Each processing unit also comprises N load store units (LSUs) that implement load and store operations between the shared memory and the register file. Each processing unit includes an interconnect network that connects each of the cores to the register file and the LSU to the register file, shared memory. In an embodiment, the interconnect network is a crossbar that can be configured to connect any of the cores to any of the registers in the register file and connect the LSUs to the register file and memory locations in shared memory.

The shared memory is an array of on-chip memory that allows for data storage and communication between the processing units and between threads within a processing unit. In an embodiment, the shared memory comprises 128 KB of storage capacity and is in the path from each of the processing units to the memory partition unit 480. The shared memory can be used to cache reads and writes. One or more of the shared memory, L1 cache, L2 cache, and memory 404 are backing stores.

Combining data cache and shared memory functionality into a single memory block provides the best overall performance for both types of memory accesses. The capacity is usable as a cache by programs that do not use shared memory. For example, if shared memory is configured to use half of the capacity, texture and load/store operations can use the remaining capacity. Integration within the shared memory enables the shared memory to function as a high-throughput conduit for streaming data while simultaneously providing high-bandwidth and low-latency access to frequently reused data.

When configured for general purpose parallel computation, a simpler configuration can be used compared with graphics processing. Specifically, fixed function graphics processing units, are bypassed, creating a much simpler programming model. In the general purpose parallel computation configuration, the work distribution unit 425 assigns and distributes blocks of threads directly to the processing units within the GPCs 450. Threads execute the same program, using a unique thread ID in the calculation to ensure each thread generates unique results, using the processing unit(s) to execute the program and perform calculations, shared memory to communicate between threads, and the LSU to read and write global memory through the shared memory and the memory partition unit 480. When configured for general purpose parallel computation, the processing units can also write commands that the scheduler unit 420 can use to launch new work on the processing units.

The PPUs 400 may each include, and/or be configured to perform functions of, one or more processing cores and/or components thereof, such as Tensor Cores (TCs), Tensor Processing Units (TPUs), Pixel Visual Cores (PVCs), Ray Tracing (RT) Cores, Vision Processing Units (VPUs), Graphics Processing Clusters (GPCs), Texture Processing Clusters (TPCs), Streaming Multiprocessors (SMs), Tree Traversal Units (TTUs), Artificial Intelligence Accelerators (AIAs), Deep Learning Accelerators (DLAs), Arithmetic-Logic Units (ALUs), Application-Specific Integrated Circuits (ASICs), Floating Point Units (FPUs), input/output (I/O) elements, peripheral component interconnect (PCI) or peripheral component interconnect express (PCIe) elements, and/or the like.

The PPU 400 may be included in a desktop computer, a laptop computer, a tablet computer, servers, supercomputers, a smart-phone (e.g., a wireless, hand-held device), personal digital assistant (PDA), a digital camera, a vehicle, a head mounted display, a hand-held electronic device, and the like. In an embodiment, the PPU 400 is embodied on a single semiconductor substrate. In another embodiment, the PPU 400 is included in a system-on-a-chip (SoC) along with one or more other devices such as additional PPUs 400, the memory 404, a reduced instruction set computer (RISC) CPU, a memory management unit (MMU), a digital-to-analog converter (DAC), and the like.

In an embodiment, the PPU 400 may be included on a graphics card that includes one or more memory devices. The graphics card may be configured to interface with a PCIe slot on a motherboard of a desktop computer. In yet another embodiment, the PPU 400 may be an integrated graphics processing unit (iGPU) or parallel processor included in the chipset of the motherboard. In yet another embodiment, the PPU 400 may be realized in reconfigurable hardware. In yet another embodiment, parts of the PPU 400 may be realized in reconfigurable hardware.

Exemplary Computing System

Systems with multiple GPUs and CPUs are used in a variety of industries as developers expose and leverage more parallelism in applications such as artificial intelligence computing. High-performance GPU-accelerated systems with tens to many thousands of compute nodes are deployed in data centers, research facilities, and supercomputers to solve ever larger problems. As the number of processing devices within the high-performance systems increases, the communication and data transfer mechanisms need to scale to support the increased bandwidth.

Figure 5A:
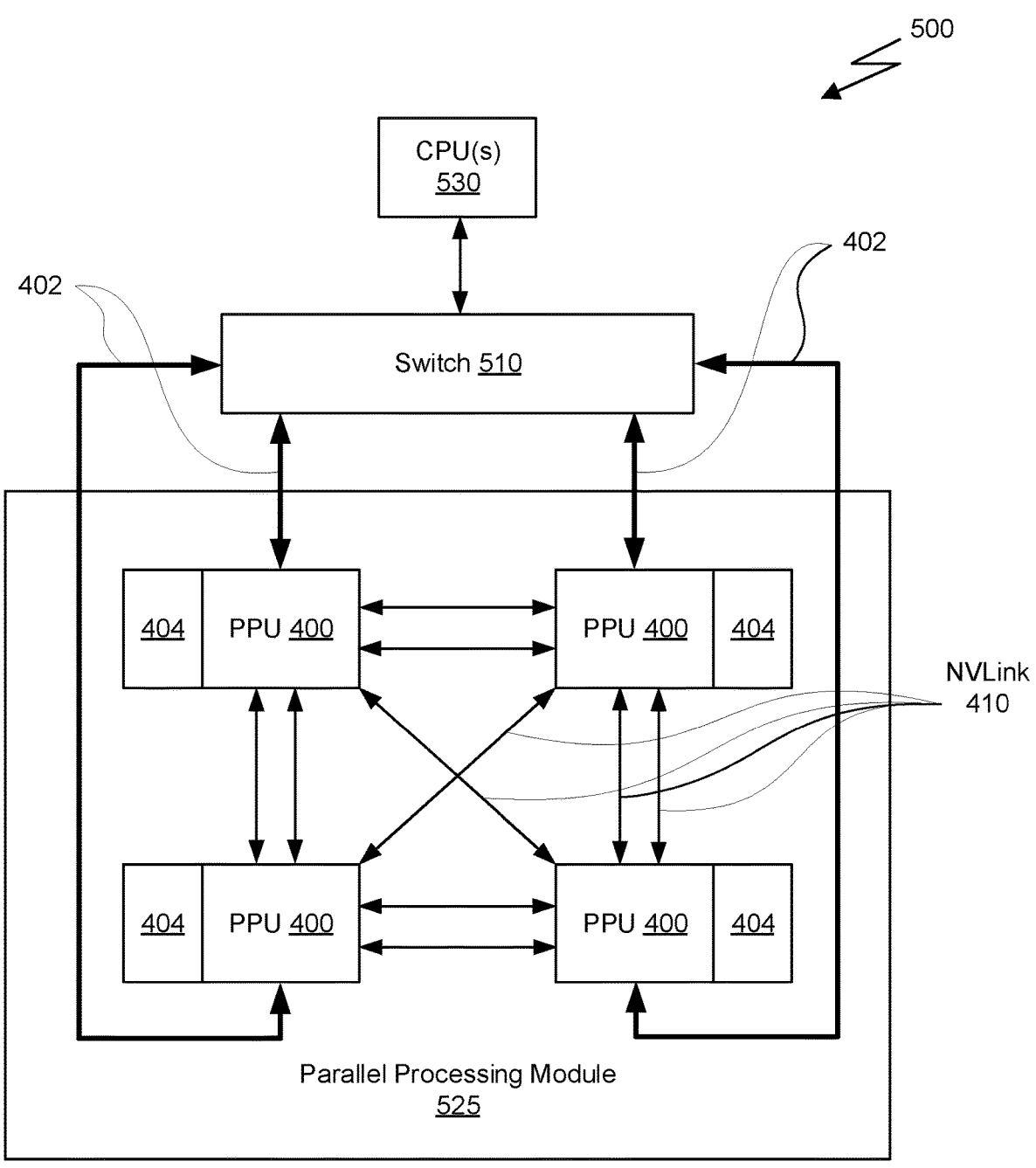
FIG. 5A is a conceptual diagram of a processing system implemented using the PPU of FIG. 4, suitable for use in implementing some embodiments of the present disclosure.

FIG. 5A is a conceptual diagram of a processing system 500 implemented using the PPU 400 of FIG. 4, in accordance with an embodiment. The exemplary system 565 may be configured to implement aspects of the systems and methods of the present disclosure. The processing system 500 includes a CPU 530, switch 510, and multiple PPUs 400, and respective memories 404.

Figure 5B:
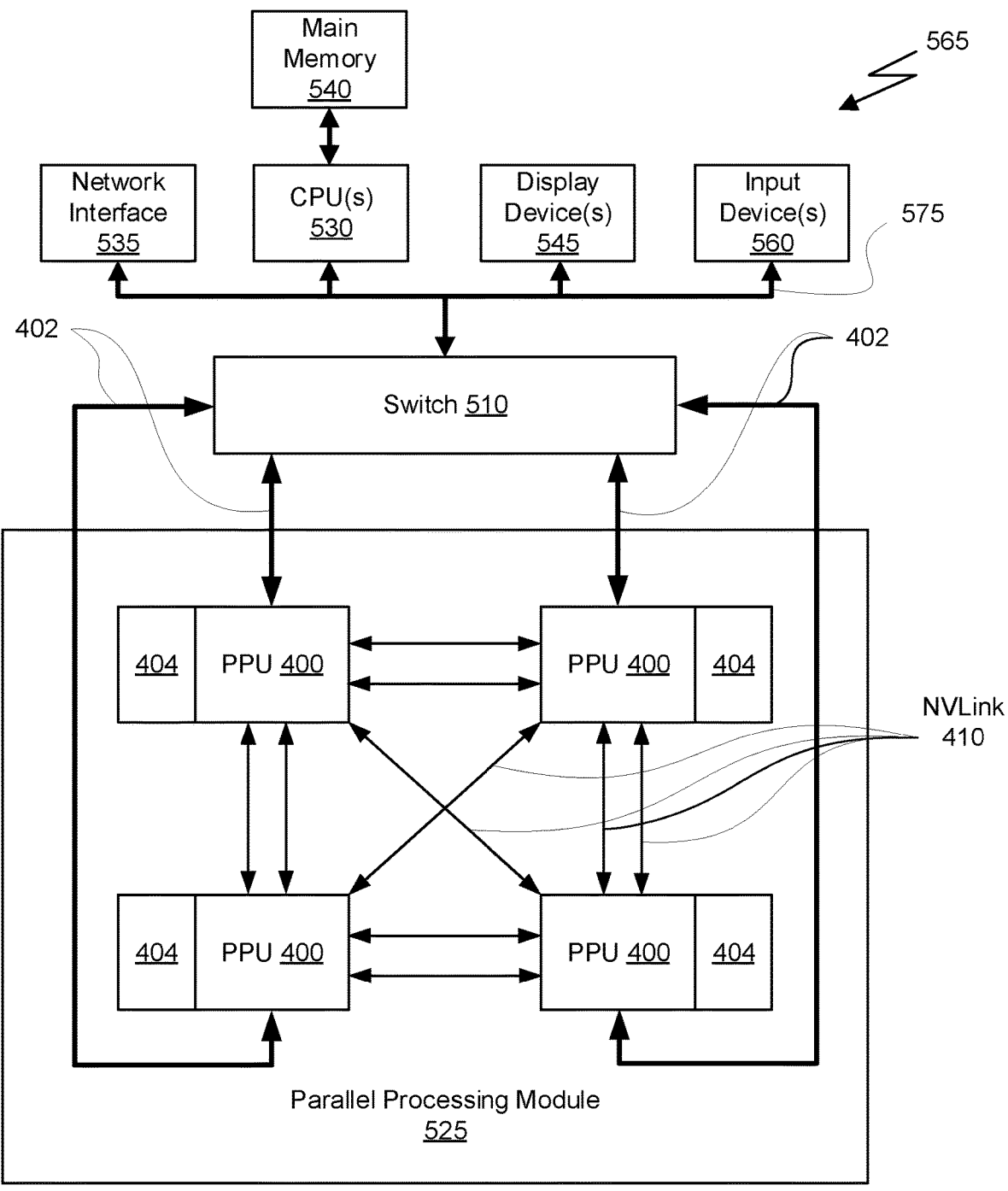
FIG. 5B illustrates an exemplary system in which the various architecture and/or functionality of the various previous embodiments may be implemented.

The NVLink 410 provides high-speed communication links between each of the PPUs 400. Although a particular number of NVLink 410 and interconnect 402 connections are illustrated in FIG. 5B, the number of connections to each PPU 400 and the CPU 530 may vary. The switch 510 interfaces between the interconnect 402 and the CPU 530. The PPUs 400, memories 404, and NVLinks 410 may be situated on a single semiconductor platform to form a parallel processing module 525. In an embodiment, the switch 510 supports two or more protocols to interface between various different connections and/or links.

In another embodiment (not shown), the NVLink 410 provides one or more high-speed communication links between each of the PPUs 400 and the CPU 530 and the switch 510 interfaces between the interconnect 402 and each of the PPUs 400. The PPUs 400, memories 404, and interconnect 402 may be situated on a single semiconductor platform to form a parallel processing module 525. In yet another embodiment (not shown), the interconnect 402 provides one or more communication links between each of the PPUs 400 and the CPU 530 and the switch 510 interfaces between each of the PPUs 400 using the NVLink 410 to provide one or more high-speed communication links between the PPUs 400. In another embodiment (not shown), the NVLink 410 provides one or more high-speed communication links between the PPUs 400 and the CPU 530 through the switch 510. In yet another embodiment (not shown), the interconnect 402 provides one or more communication links between each of the PPUs 400 directly. One or more of the NVLink 410 high-speed communication links may be implemented as a physical NVLink interconnect or either an on-chip or on-die interconnect using the same protocol as the NVLink 410.

In the context of the present description, a single semiconductor platform may refer to a sole unitary semiconductor-based integrated circuit fabricated on a die or chip. It should be noted that the term single semiconductor platform may also refer to multi-chip modules with increased connectivity which simulate on-chip operation and make substantial improvements over utilizing a conventional bus implementation. Of course, the various circuits or devices may also be situated separately or in various combinations of semiconductor platforms per the desires of the user. Alternately, the parallel processing module 525 may be implemented as a circuit board substrate and each of the PPUs 400 and/or memories 404 may be packaged devices. In an embodiment, the CPU 530, switch 510, and the parallel processing module 525 are situated on a single semiconductor platform.

In an embodiment, the signaling rate of each NVLink 410 is 20 to 25 Gigabits/second and each PPU 400 includes six NVLink 410 interfaces (as shown in FIG. 5A, five NVLink 410 interfaces are included for each PPU 400). Each NVLink 410 provides a data transfer rate of 25 Gigabytes/second in each direction, with six links providing 400 Gigabytes/second. The NVLinks 410 can be used exclusively for PPU-to-PPU communication as shown in FIG. 5A, or some combination of PPU-to-PPU and PPU-to-CPU, when the CPU 530 also includes one or more NVLink 410 interfaces.

In an embodiment, the NVLink 410 allows direct load/store/atomic access from the CPU 530 to each PPU's 400 memory 404. In an embodiment, the NVLink 410 supports coherency operations, allowing data read from the memories 404 to be stored in the cache hierarchy of the CPU 530, reducing cache access latency for the CPU 530. In an embodiment, the NVLink 410 includes support for Address Translation Services (ATS), allowing the PPU 400 to directly access page tables within the CPU 530. One or more of the NVLinks 410 may also be configured to operate in a low-power mode.

FIG. 5B illustrates an exemplary system 565 in which the various architecture and/or functionality of the various previous embodiments may be implemented. The exemplary system 565 may be configured to implement the systems and methods of the present disclosure.

As shown, a system 565 is provided including at least one central processing unit 530 that is connected to a communication bus 575. The communication bus 575 may directly or indirectly couple one or more of the following devices: main memory 540, network interface 535, CPU(s) 530, display device(s) 545, input device(s) 560, switch 510, and parallel processing system 525. The communication bus 575 may be implemented using any suitable protocol and may represent one or more links or busses, such as an address bus, a data bus, a control bus, or a combination thereof. The communication bus 575 may include one or more bus or link types, such as an industry standard architecture (ISA) bus, an extended industry standard architecture (EISA) bus, a video electronics standards association (VESA) bus, a peripheral component interconnect (PCI) bus, a peripheral component interconnect express (PCIe) bus, HyperTransport, and/or another type of bus or link. In some embodiments, there are direct connections between components. As an example, the CPU(s) 530 may be directly connected to the main memory 540. Further, the CPU(s) 530 may be directly connected to the parallel processing system 525. Where there is direct, or point-to-point connection between components, the communication bus 575 may include a PCIe link to carry out the connection. In these examples, a PCI bus need not be included in the system 565.

Figure 5C:
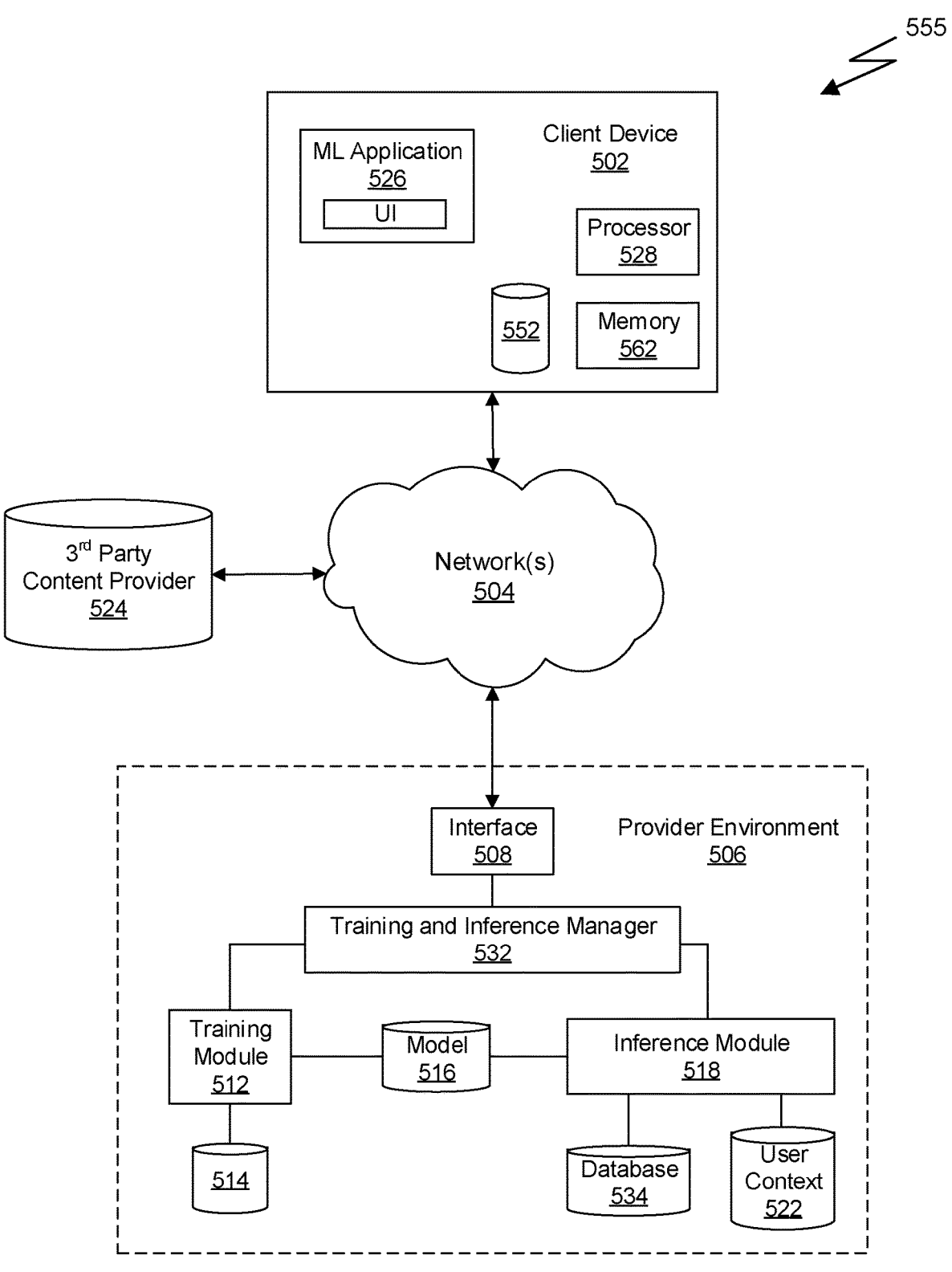
FIG. 5C illustrates components of an exemplary system that can be used to train and utilize machine learning, in at least one embodiment.

Although the various blocks of FIG. 5C are shown as connected via the communication bus 575 with lines, this is not intended to be limiting and is for clarity only. For example, in some embodiments, a presentation component, such as display device(s) 545, may be considered an I/O component, such as input device(s) 560 (e.g., if the display is a touch screen). As another example, the CPU(s) 530 and/or parallel processing system 525 may include memory (e.g., the main memory 540 may be representative of a storage device in addition to the parallel processing system 525, the CPUs 530, and/or other components). In other words, the computing device of FIG. 5C is merely illustrative. Distinction is not made between such categories as "workstation," "server," "laptop," "desktop," "tablet," "client device," "mobile device," "hand-held device," "game console," "electronic control unit (ECU)," "virtual reality system," and/or other device or system types, as all are contemplated within the scope of the computing device of FIG. 5C.

The system 565 also includes a main memory 540. Control logic (software) and data are stored in the main memory 540 which may take the form of a variety of computer-readable media. The computer-readable media may be any available media that may be accessed by the system 565. The computer-readable media may include both volatile and nonvolatile media, and removable and non-removable media. By way of example, and not limitation, the computer-readable media may comprise computer-storage media and communication media.

The computer-storage media may include both volatile and nonvolatile media and/or removable and non-removable media implemented in any method or technology for storage of information such as computer-readable instructions, data structures, program modules, and/or other data types. For example, the main memory 540 may store computer-readable instructions (e.g., that represent a program(s) and/or a program element(s), such as an operating system. Computer-storage media may include, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which may be used to store the desired information and which may be accessed by system 565. As used herein, computer storage media does not comprise signals per se.

The computer storage media may embody computer-readable instructions, data structures, program modules, and/or other data types in a modulated data signal such as a carrier wave or other transport mechanism and includes any information delivery media. The term "modulated data signal" may refer to a signal that has one or more of its characteristics set or changed in such a manner as to encode information in the signal. By way of example, and not limitation, the computer storage media may include wired media such as a wired network or direct-wired connection, and wireless media such as acoustic, RF, infrared and other wireless media. Combinations of any of the above should also be included within the scope of computer-readable media.

Computer programs, when executed, enable the system 565 to perform various functions. The CPU(s) 530 may be configured to execute at least some of the computer-readable instructions to control one or more components of the system 565 to perform one or more of the methods and/or processes described herein. The CPU(s) 530 may each include one or more cores (e.g., one, two, four, eight, twenty-eight, seventy-two, etc.) that are capable of handling a multitude of software threads simultaneously. The CPU(s) 530 may include any type of processor, and may include different types of processors depending on the type of system 565 implemented (e.g., processors with fewer cores for mobile devices and processors with more cores for servers). For example, depending on the type of system 565, the processor may be an Advanced RISC Machines (ARM) processor implemented using Reduced Instruction Set Computing (RISC) or an x86 processor implemented using Complex Instruction Set Computing (CISC). The system 565 may include one or more CPUs 530 in addition to one or more microprocessors or supplementary co-processors, such as math co-processors.

In addition to or alternatively from the CPU(s) 530, the parallel processing module 525 may be configured to execute at least some of the computer-readable instructions to control one or more components of the system 565 to perform one or more of the methods and/or processes described herein. The parallel processing module 525 may be used by the system 565 to render graphics (e.g., 3D graphics) or perform general purpose computations. For example, the parallel processing module 525 may be used for General-Purpose computing on GPUs (GPGPU). In embodiments, the CPU(s) 530 and/or the parallel processing module 525 may discretely or jointly perform any combination of the methods, processes and/or portions thereof.

The system 565 also includes input device(s) 560, the parallel processing system 525, and display device(s) 545. The display device(s) 545 may include a display (e.g., a monitor, a touch screen, a television screen, a heads-up-display (HUD), other display types, or a combination thereof), speakers, and/or other presentation components. The display device(s) 545 may receive data from other components (e.g., the parallel processing system 525, the CPU(s) 530, etc.), and output the data (e.g., as an image, video, sound, etc.).

The network interface 535 may enable the system 565 to be logically coupled to other devices including the input devices 560, the display device(s) 545, and/or other components, some of which may be built in to (e.g., integrated in) the system 565. Illustrative input devices 560 include a microphone, mouse, keyboard, joystick, game pad, game controller, satellite dish, scanner, printer, wireless device, etc. The input devices 560 may provide a natural user interface (NUI) that processes air gestures, voice, or other physiological inputs generated by a user. In some instances, inputs may be transmitted to an appropriate network element for further processing. An NUI may implement any combination of speech recognition, stylus recognition, facial recognition, biometric recognition, gesture recognition both on screen and adjacent to the screen, air gestures, head and eye tracking, and touch recognition (as described in more detail below) associated with a display of the system 565. The system 565 may be include depth cameras, such as stereoscopic camera systems, infrared camera systems, RGB camera systems, touchscreen technology, and combinations of these, for gesture detection and recognition. Additionally, the system 565 may include accelerometers or gyroscopes (e.g., as part of an inertia measurement unit (IMU)) that enable detection of motion. In some examples, the output of the accelerometers or gyroscopes may be used by the system 565 to render immersive augmented reality or virtual reality.

Further, the system 565 may be coupled to a network (e.g., a telecommunications network, local area network (LAN), wireless network, wide area network (WAN) such as the Internet, peer-to-peer network, cable network, or the like) through a network interface 535 for communication purposes. The system 565 may be included within a distributed network and/or cloud computing environment.

The network interface 535 may include one or more receivers, transmitters, and/or transceivers that enable the system 565 to communicate with other computing devices via an electronic communication network, included wired and/or wireless communications. The network interface 535 may include components and functionality to enable communication over any of a number of different networks, such as wireless networks (e.g., Wi-Fi, Z-Wave, Bluetooth, Bluetooth LE, ZigBee, etc.), wired networks (e.g., communicating over Ethernet or InfiniBand), low-power wide-area networks (e.g., LoRaWAN, SigFox, etc.), and/or the Internet.

The system 565 may also include a secondary storage (not shown). The secondary storage 610 includes, for example, a hard disk drive and/or a removable storage drive, representing a floppy disk drive, a magnetic tape drive, a compact disk drive, digital versatile disk (DVD) drive, recording device, universal serial bus (USB) flash memory. The removable storage drive reads from and/or writes to a removable storage unit in a well-known manner. The system 565 may also include a hard-wired power supply, a battery power supply, or a combination thereof (not shown). The power supply may provide power to the system 565 to enable the components of the system 565 to operate.

Each of the foregoing modules and/or devices may even be situated on a single semiconductor platform to form the system 565. Alternately, the various modules may also be situated separately or in various combinations of semiconductor platforms per the desires of the user. While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

Example Network Environments

Network environments suitable for use in implementing embodiments of the disclosure may include one or more client devices, servers, network attached storage (NAS), other backend devices, and/or other device types. The client devices, servers, and/or other device types (e.g., each device) may be implemented on one or more instances of the processing system 500 of FIG. 5A and/or exemplary system 565 of FIG. 5B—e.g., each device may include similar components, features, and/or functionality of the processing system 500 and/or exemplary system 565.

Components of a network environment may communicate with each other via a network(s), which may be wired, wireless, or both. The network may include multiple networks, or a network of networks. By way of example, the network may include one or more Wide Area Networks (WANs), one or more Local Area Networks (LANs), one or more public networks such as the Internet and/or a public switched telephone network (PSTN), and/or one or more private networks. Where the network includes a wireless telecommunications network, components such as a base station, a communications tower, or even access points (as well as other components) may provide wireless connectivity.

Compatible network environments may include one or more peer-to-peer network environments—in which case a server may not be included in a network environment—and one or more client-server network environments—in which case one or more servers may be included in a network environment. In peer-to-peer network environments, functionality described herein with respect to a server(s) may be implemented on any number of client devices.

In at least one embodiment, a network environment may include one or more cloud-based network environments, a distributed computing environment, a combination thereof, etc. A cloud-based network environment may include a framework layer, a job scheduler, a resource manager, and a distributed file system implemented on one or more of servers, which may include one or more core network servers and/or edge servers. A framework layer may include a framework to support software of a software layer and/or one or more application(s) of an application layer. The software or application(s) may respectively include web-based service software or applications. In embodiments, one or more of the client devices may use the web-based service software or applications (e.g., by accessing the service software and/or applications via one or more application programming interfaces (APIs)). The framework layer may be, but is not limited to, a type of free and open-source software web application framework such as that may use a distributed file system for large-scale data processing (e.g., "big data").

A cloud-based network environment may provide cloud computing and/or cloud storage that carries out any combination of computing and/or data storage functions described herein (or one or more portions thereof). Any of these various functions may be distributed over multiple locations from central or core servers (e.g., of one or more data centers that may be distributed across a state, a region, a country, the globe, etc.). If a connection to a user (e.g., a client device) is relatively close to an edge server(s), a core server(s) may designate at least a portion of the functionality to the edge server(s). A cloud-based network environment may be private (e.g., limited to a single organization), may be public (e.g., available to many organizations), and/or a combination thereof (e.g., a hybrid cloud environment).

The client device(s) may include at least some of the components, features, and functionality of the example processing system 500 of FIG. 5B and/or exemplary system 565 of FIG. 5C. By way of example and not limitation, a client device may be embodied as a Personal Computer (PC), a laptop computer, a mobile device, a smartphone, a tablet computer, a smart watch, a wearable computer, a Personal Digital Assistant (PDA), an MP3 player, a virtual reality headset, a Global Positioning System (GPS) or device, a video player, a video camera, a surveillance device or system, a vehicle, a boat, a flying vessel, a virtual machine, a drone, a robot, a handheld communications device, a hospital device, a gaming device or system, an entertainment system, a vehicle computer system, an embedded system controller, a remote control, an appliance, a consumer electronic device, a workstation, an edge device, any combination of these delineated devices, or any other suitable device.

Machine Learning

Deep neural networks (DNNs) developed on processors, such as the PPU 400 have been used for diverse use cases, from self-driving cars to faster drug development, from automatic image captioning in online image databases to smart real-time language translation in video chat applications. Deep learning is a technique that models the neural learning process of the human brain, continually learning, continually getting smarter, and delivering more accurate results more quickly over time. A child is initially taught by an adult to correctly identify and classify various shapes, eventually being able to identify shapes without any coaching. Similarly, a deep learning or neural learning system needs to be trained in object recognition and classification for it get smarter and more efficient at identifying basic objects, occluded objects, etc., while also assigning context to objects.

At the simplest level, neurons in the human brain look at various inputs that are received, importance levels are assigned to each of these inputs, and output is passed on to other neurons to act upon. An artificial neuron or perceptron is the most basic model of a neural network. In one example, a perceptron may receive one or more inputs that represent various features of an object that the perceptron is being trained to recognize and classify, and each of these features is assigned a certain weight based on the importance of that feature in defining the shape of an object.

A deep neural network (DNN) model includes multiple layers of many connected nodes (e.g., perceptrons, Boltzmann machines, radial basis functions, convolutional layers, etc.) that can be trained with enormous amounts of input data to quickly solve complex problems with high accuracy. In one example, a first layer of the DNN model breaks down an input image of an automobile into various sections and looks for basic patterns such as lines and angles. The second layer assembles the lines to look for higher level patterns such as wheels, windshields, and mirrors. The next layer identifies the type of vehicle, and the final few layers generate a label for the input image, identifying the model of a specific automobile brand.

Once the DNN is trained, the DNN can be deployed and used to identify and classify objects or patterns in a process known as inference. Examples of inference (the process through which a DNN extracts useful information from a given input) include identifying handwritten numbers on checks deposited into ATM machines, identifying images of friends in photos, delivering movie recommendations to over fifty million users, identifying and classifying different types of automobiles, pedestrians, and road hazards in driverless cars, or translating human speech in real-time.

During training, data flows through the DNN in a forward propagation phase until a prediction is produced that indicates a label corresponding to the input. If the neural network does not correctly label the input, then errors between the correct label and the predicted label are analyzed, and the weights are adjusted for each feature during a backward propagation phase until the DNN correctly labels the input and other inputs in a training dataset. Training complex neural networks requires massive amounts of parallel computing performance, including floating-point multiplications and additions that are supported by the PPU 400. Inferencing is less compute-intensive than training, being a latency-sensitive process where a trained neural network is applied to new inputs it has not seen before to classify images, detect emotions, identify recommendations, recognize and translate speech, and generally infer new information.

Neural networks rely heavily on matrix math operations, and complex multi-layered networks require tremendous amounts of floating-point performance and bandwidth for both efficiency and speed. With thousands of processing cores, optimized for matrix math operations, and delivering tens to hundreds of TFLOPS of performance, the PPU 400 is a computing platform capable of delivering performance required for deep neural network-based artificial intelligence and machine learning applications.

FIG. 5C illustrates components of an exemplary system 555 that can be used to train and utilize machine learning, in accordance with at least one embodiment. As will be discussed, various components can be provided by various combinations of computing devices and resources, or a single computing system, which may be under control of a single entity or multiple entities. Further, aspects may be triggered, initiated, or requested by different entities. In at least one embodiment training of a neural network might be instructed by a provider associated with provider environment 506, while in at least one embodiment training might be requested by a customer or other user having access to a provider environment through a client device 502 or other such resource. In at least one embodiment, training data (or data to be analyzed by a trained neural network) can be provided by a provider, a user, or a third party content provider 524. In at least one embodiment, client device 502 may be a vehicle or object that is to be navigated on behalf of a user, for example, which can submit requests and/or receive instructions that assist in navigation of a device.

In at least one embodiment, requests are able to be submitted across at least one network 504 to be received by a provider environment 506. In at least one embodiment, a client device may be any appropriate electronic and/or computing devices enabling a user to generate and send such requests, such as, but not limited to, desktop computers, notebook computers, computer servers, smartphones, tablet computers, gaming consoles (portable or otherwise), computer processors, computing logic, and set-top boxes. Network(s) 504 can include any appropriate network for transmitting a request or other such data, as may include Internet, an intranet, an Ethernet, a cellular network, a local area network (LAN), a wide area network (WAN), a personal area network (PAN), an ad hoc network of direct wireless connections among peers, and so on.

In at least one embodiment, requests can be received at an interface layer 508, which can forward data to a training and inference manager 532, in this example. The training and inference manager 532 can be a system or service including hardware and software for managing requests and service corresponding data or content, in at least one embodiment, the training and inference manager 532 can receive a request to train a neural network, and can provide data for a request to a training module 512. In at least one embodiment, training module 512 can select an appropriate model or neural network to be used, if not specified by the request, and can train a model using relevant training data. In at least one embodiment, training data can be a batch of data stored in a training data repository 514, received from client device 502, or obtained from a third party provider 524. In at least one embodiment, training module 512 can be responsible for training data. A neural network can be any appropriate network, such as a recurrent neural network (RNN) or convolutional neural network (CNN). Once a neural network is trained and successfully evaluated, a trained neural network can be stored in a model repository 516, for example, that may store different models or networks for users, applications, or services, etc. In at least one embodiment, there may be multiple models for a single application or entity, as may be utilized based on a number of different factors.

In at least one embodiment, at a subsequent point in time, a request may be received from client device 502 (or another such device) for content (e.g., path determinations) or data that is at least partially determined or impacted by a trained neural network. This request can include, for example, input data to be processed using a neural network to obtain one or more inferences or other output values, classifications, or predictions, or for at least one embodiment, input data can be received by interface layer 508 and directed to inference module 518, although a different system or service can be used as well. In at least one embodiment, inference module 518 can obtain an appropriate trained network, such as a trained deep neural network (DNN) as discussed herein, from model repository 516 if not already stored locally to inference module 518. Inference module 518 can provide data as input to a trained network, which can then generate one or more inferences as output. This may include, for example, a classification of an instance of input data. In at least one embodiment, inferences can then be transmitted to client device 502 for display or other communication to a user. In at least one embodiment, context data for a user may also be stored to a user context data repository 522, which may include data about a user which may be useful as input to a network in generating inferences, or determining data to return to a user after obtaining instances. In at least one embodiment, relevant data, which may include at least some of input or inference data, may also be stored to a local database 534 for processing future requests. In at least one embodiment, a user can use account information or other information to access resources or functionality of a provider environment. In at least one embodiment, if permitted and available, user data may also be collected and used to further train models, in order to provide more accurate inferences for future requests. In at least one embodiment, requests may be received through a user interface to a machine learning application 526 executing on client device 502, and results displayed through a same interface. A client device can include resources such as a processor 528 and memory 562 for generating a request and processing results or a response, as well as at least one data storage element 552 for storing data for machine learning application 526.

In at least one embodiment a processor 528 (or a processor of training module 512 or inference module 518) will be a central processing unit (CPU). As mentioned, however, resources in such environments can utilize GPUs to process data for at least certain types of requests. With thousands of cores, GPUs, such as PPU 300 are designed to handle substantial parallel workloads and, therefore, have become popular in deep learning for training neural networks and generating predictions. While use of GPUs for offline builds has enabled faster training of larger and more complex models, generating predictions offline implies that either request-time input features cannot be used or predictions must be generated for all permutations of features and stored in a lookup table to serve real-time requests. If a deep learning framework supports a CPU-mode and a model is small and simple enough to perform a feed-forward on a CPU with a reasonable latency, then a service on a CPU instance could host a model. In this case, training can be done offline on a GPU and inference done in real-time on a CPU. If a CPU approach is not viable, then a service can run on a GPU instance. Because GPUs have different performance and cost characteristics than CPUs, however, running a service that offloads a runtime algorithm to a GPU can require it to be designed differently from a CPU based service.

In at least one embodiment, video data can be provided from client device 502 for enhancement in provider environment 506. In at least one embodiment, video data can be processed for enhancement on client device 502. In at least one embodiment, video data may be streamed from a third party content provider 524 and enhanced by third party content provider 524, provider environment 506, or client device 502. In at least one embodiment, video data can be provided from client device 502 for use as training data in provider environment 506.

In at least one embodiment, supervised and/or unsupervised training can be performed by the client device 502 and/or the provider environment 506. In at least one embodiment, a set of training data 514 (e.g., classified or labeled data) is provided as input to function as training data.

In at least one embodiment, training data can include instances of at least one type of object for which a neural network is to be trained, as well as information that identifies that type of object. In at least one embodiment, training data might include a set of images that each includes a representation of a type of object, where each image also includes, or is associated with, a label, metadata, classification, or other piece of information identifying a type of object represented in a respective image. Various other types of data may be used as training data as well, as may include text data, audio data, video data, and so on. In at least one embodiment, training data 514 is provided as training input to a training module 512. In at least one embodiment, training module 512 can be a system or service that includes hardware and software, such as one or more computing devices executing a training application, for training a neural network (or other model or algorithm, etc.). In at least one embodiment, training module 512 receives an instruction or request indicating a type of model to be used for training, in at least one embodiment, a model can be any appropriate statistical model, network, or algorithm useful for such purposes, as may include an artificial neural network, deep learning algorithm, learning classifier, Bayesian network, and so on. In at least one embodiment, training module 512 can select an initial model, or other untrained model, from an appropriate repository 516 and utilize training data 514 to train a model, thereby generating a trained model (e.g., trained deep neural network) that can be used to classify similar types of data, or generate other such inferences. In at least one embodiment where training data is not used, an appropriate initial model can still be selected for training on input data per training module 512.

In at least one embodiment, a model can be trained in a number of different ways, as may depend in part upon a type of model selected. In at least one embodiment, a machine learning algorithm can be provided with a set of training data, where a model is a model artifact created by a training process. In at least one embodiment, each instance of training data contains a correct answer (e.g., classification), which can be referred to as a target or target attribute. In at least one embodiment, a learning algorithm finds patterns in training data that map input data attributes to a target, an answer to be predicted, and a machine learning model is output that captures these patterns. In at least one embodiment, a machine learning model can then be used to obtain predictions on new data for which a target is not specified.

In at least one embodiment, training and inference manager 532 can select from a set of machine learning models including binary classification, multiclass classification, generative, and regression models. In at least one embodiment, a type of model to be used can depend at least in part upon a type of target to be predicted.

Example Game Streaming System

Figure 6:
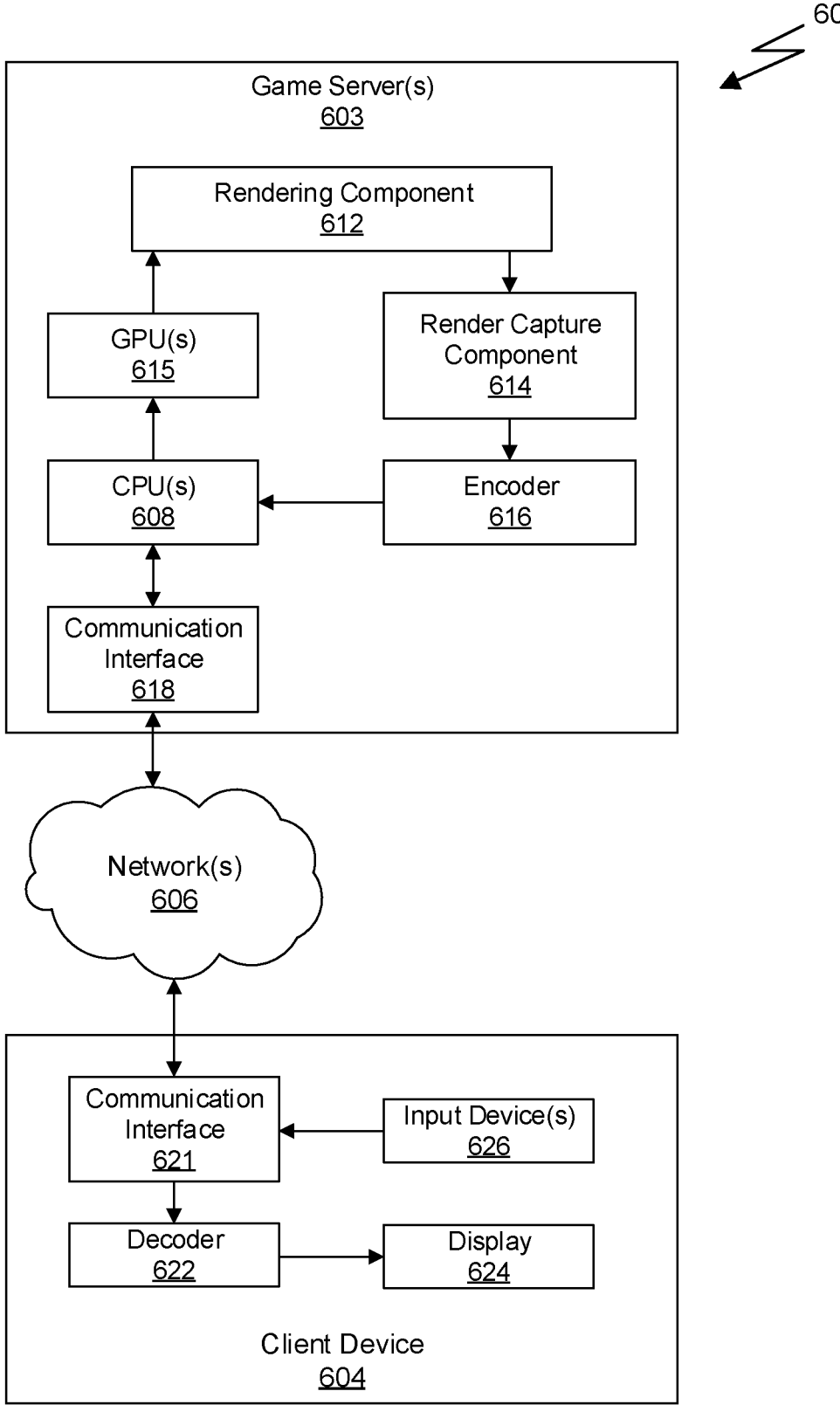
FIG. 6 illustrates an exemplary game streaming system suitable for use in implementing some embodiments of the present disclosure.

FIG. 6 is an example system diagram for a game streaming system 605, in accordance with some embodiments of the present disclosure. FIG. 6 includes game server(s) 603 (which may include similar components, features, and/or functionality to the example processing system 500 of FIG. 5A and/or exemplary system 565 of FIG. 5B), client device(s) 604 (which may include similar components, features, and/or functionality to the example processing system 500 of FIG. 5A and/or exemplary system 565 of FIG. 5B), and network(s) 606 (which may be similar to the network(s) described herein). In some embodiments of the present disclosure, the system 605 may be implemented.

In the system 605, for a game session, the client device(s) 604 may only receive input data in response to inputs to the input device(s), transmit the input data to the game server(s) 603, receive encoded display data from the game server(s) 603, and display the display data on the display 624. As such, the more computationally intense computing and processing is offloaded to the game server(s) 603 (e.g., rendering—in particular ray or path tracing—for graphical output of the game session is executed by the GPU(s) of the game server(s) 603). In other words, the game session is streamed to the client device(s) 604 from the game server(s) 603, thereby reducing the requirements of the client device(s) 604 for graphics processing and rendering.

For example, with respect to an instantiation of a game session, a client device 604 may be displaying a frame of the game session on the display 624 based on receiving the display data from the game server(s) 603. The client device 604 may receive an input to one of the input device(s) and generate input data in response. The client device 604 may transmit the input data to the game server(s) 603 via the communication interface 621 and over the network(s) 606 (e.g., the Internet), and the game server(s) 603 may receive the input data via the communication interface 618. The CPU(s) may receive the input data, process the input data, and transmit data to the GPU(s) that causes the GPU(s) to generate a rendering of the game session. For example, the input data may be representative of a movement of a character of the user in a game, firing a weapon, reloading, passing a ball, turning a vehicle, etc. The rendering component 612 may render the game session (e.g., representative of the result of the input data) and the render capture component 614 may capture the rendering of the game session as display data (e.g., as image data capturing the rendered frame of the game session). The rendering of the game session may include ray or path-traced lighting and/or shadow effects, computed using one or more parallel processing units-such as GPUs, which may further employ the use of one or more dedicated hardware accelerators or processing cores to perform ray or path-tracing techniques—of the game server(s) 603. The encoder 616 may then encode the display data to generate encoded display data and the encoded display data may be transmitted to the client device 604 over the network(s) 606 via the communication interface 618. The client device 604 may receive the encoded display data via the communication interface 621 and the decoder 622 may decode the encoded display data to generate the display data. The client device 604 may then display the display data via the display 624.

It is noted that the techniques described herein may be embodied in executable instructions stored in a computer readable medium for use by or in connection with a processor-based instruction execution machine, system, apparatus, or device. It will be appreciated by those skilled in the art that, for some embodiments, various types of computer-readable media can be included for storing data. As used herein, a "computer-readable medium" includes one or more of any suitable media for storing the executable instructions of a computer program such that the instruction execution machine, system, apparatus, or device may read (or fetch) the instructions from the computer-readable medium and execute the instructions for carrying out the described embodiments. Suitable storage formats include one or more of an electronic, magnetic, optical, and electromagnetic format. A non-exhaustive list of conventional exemplary computer-readable medium includes: a portable computer diskette; a random-access memory (RAM); a read-only memory (ROM); an erasable programmable read only memory (EPROM); a flash memory device; and optical storage devices, including a portable compact disc (CD), a portable digital video disc (DVD), and the like.

It should be understood that the arrangement of components illustrated in the attached Figures are for illustrative purposes and that other arrangements are possible. For example, one or more of the elements described herein may be realized, in whole or in part, as an electronic hardware component. Other elements may be implemented in software, hardware, or a combination of software and hardware. Moreover, some or all of these other elements may be combined, some may be omitted altogether, and additional components may be added while still achieving the functionality described herein. Thus, the subject matter described herein may be embodied in many different variations, and all such variations are contemplated to be within the scope of the claims.

To facilitate an understanding of the subject matter described herein, many aspects are described in terms of sequences of actions. It will be recognized by those skilled in the art that the various actions may be performed by specialized circuits or circuitry, by program instructions being executed by one or more processors, or by a combination of both. The description herein of any sequence of actions is not intended to imply that the specific order described for performing that sequence must be followed. All methods described herein may be performed in any suitable order unless otherwise indicated herein or otherwise clearly contradicted by context.

The use of the terms "a" and "an" and "the" and similar references in the context of describing the subject matter (particularly in the context of the following claims) are to be construed to cover both the singular and the plural, unless otherwise indicated herein or clearly contradicted by context. The use of the term "at least one" followed by a list of one or more items (for example, "at least one of A and B") is to be construed to mean one item selected from the listed items (A or B) or any combination of two or more of the listed items (A and B), unless otherwise indicated herein or clearly contradicted by context. Furthermore, the foregoing description is for the purpose of illustration only, and not for the purpose of limitation, as the scope of protection sought is defined by the claims as set forth hereinafter together with any equivalents thereof. The use of any and all examples, or exemplary language (e.g., "such as") provided herein, is intended merely to better illustrate the subject matter and does not pose a limitation on the scope of the subject matter unless otherwise claimed. The use of the term "based on" and other like phrases indicating a condition for bringing about a result, both in the claims and in the written description, is not intended to foreclose any other conditions that bring about that result. No language in the specification should be construed as indicating any non-claimed element as essential to the practice of the invention as claimed.

What is claimed is:

1. A system comprising:
a memory storing data for an encoder-based model, a renderer, and a denoiser; and
one or more processors in communication with the memory, the one or more processors executing instructions to:
receive one or more input images:
generate, using the encoder-based model, one or more three-dimensional (3D) representations of the one or more input images, each 3D representation in the one or more representations corresponding to a particular input image of the one or more input images;
generate a feature image, using the renderer, based on the one or more 3D representations; and
generate an output image, using the denoiser, based at least on the feature image and a noisy image.

2. The system of claim 1, wherein the feature image comprises a plane-sweep volume (PSV) representation.

3. The system of claim 2, wherein generating the output image comprises generating the output image based on the feature image, the noisy image, and a relative pose vector.

4. The system of claim 1, wherein the encoder-based model comprises a deep convolution neural network (DCNN) configured to generate a set of low-resolution feature maps and a set of high-resolution feature maps using at least one atrous convolution layer.

5. The system of claim 1, wherein each of the one or more 3D representations comprises a five-dimensional (5D) frustum of shape features.

6. The system of claim 1, wherein the renderer is a volume renderer configured to trace rays through the 3D representations to generate the feature image.

7. The system of claim 1, wherein the one or more input images comprises a plurality of input images, and wherein generating the feature image comprises sampling, by the renderer, a sample from each of the 3D representations and applying a mean-pooling operator to the plurality of samples.

8. The system of claim 1, wherein the denoiser comprises a Noise Conditional Score Network (NCSN).

9. The system of claim 1, wherein the noisy image is generated by combining a plurality of noisy images corresponding to a plurality of frames of the video sequence.

10. A non-transitory computer-readable medium storing instructions that, upon execution by one or more processors, cause a computing device to:
receive one or more input images:
generate, using an encoder-based model, one or more three-dimensional (3D) representations of the one or more input images, each 3D representation in the one or more representations corresponding to a particular input image of the one or more input images:
generate, using a renderer, a feature image based on the one or more 3D representations; and
generate an output image, using a denoiser, based at least on the feature image and a noisy image.

11. A method, comprising:
receiving one or more input images:
generating, using an encoder-based model, one or more three-dimensional (3D) representations of the one or more input images, each 3D representation in the one or more representations corresponding to a particular input image of the one or more input images:
generating a feature image, using a renderer, based on the one or more 3D representations; and generating an output image, using a denoiser, based at least on the feature image and a noisy image.

12. The method of claim 11, wherein the feature image comprises a plane-sweep volume (PSV) representation.

13. The method of claim 12, wherein generating the output image comprises generating the output image based on the feature image, the noisy image, and a relative pose vector.

14. The method of claim 11, wherein the encoder-based model comprises a deep convolution neural network (DCNN) configured to generate a set of low-resolution feature maps and a set of high-resolution feature maps using at least one atrous convolution layer.

15. The method of claim 11, wherein each of the one or more 3D representations comprises a five-dimensional (5D) frustum of shape features.

16. The method of claim 11, wherein the renderer comprises a volume renderer configured to trace rays through the one or more 3D representations to generate the feature image.

17. The method of claim 11, wherein the one or more input images comprises a plurality of input images, and wherein generating the feature image comprises sampling, by the renderer, a sample from each of the 3D representations and applying a mean-pooling operator to the plurality of samples.

18. The method of claim 11, wherein the denoiser comprises a Noise Conditional Score Network (NCSN).

19. The method of claim 11, wherein each 3D representation comprises a Neural Radiance Field (NeRF).

20. The method of claim 11, wherein the noisy image is generated by combining a plurality of noisy images corresponding to a plurality of frames of the video sequence.

* * * * *